United States Patent
Higbie et al.

(10) Patent No.: US 10,152,975 B2
(45) Date of Patent: *Dec. 11, 2018

(54) VOICE-BASED INTERACTIVE CONTENT AND USER INTERFACE

(71) Applicant: XAPPMEDIA, INC., Centreville, VA (US)

(72) Inventors: Patrick B. Higbie, Centreville, VA (US); John P. Kelvie, Washington, DC (US); Michael M. Myers, Washington, DC (US); Franklin D. Raines, Washington, DC (US)

(73) Assignee: XAPPMEDIA, INC., Centreville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,866

(22) Filed: Jan. 5, 2015

(65) Prior Publication Data
US 2015/0120295 A1 Apr. 30, 2015

Related U.S. Application Data

(63) Continuation of application No. 13/875,887, filed on May 2, 2013.

(51) Int. Cl.
*G10L 17/22* (2013.01)
*G10L 15/26* (2006.01)
(Continued)

(52) U.S. Cl.
CPC .......... *G10L 17/22* (2013.01); *G06Q 30/0203* (2013.01); *G06Q 30/0251* (2013.01);
(Continued)

(58) Field of Classification Search
CPC .............................. G10L 15/26; G10L 17/22
(Continued)

(56) References Cited

U.S. PATENT DOCUMENTS

| 4,525,793 A | 6/1985 | Stackhouse |
| 5,301,227 A | 4/1994 | Kamei et al. |

(Continued)

FOREIGN PATENT DOCUMENTS

| CN | 1666527 | 9/2005 |
| CN | 1805487 | 7/2006 |

(Continued)

OTHER PUBLICATIONS

Honda—Voice Command Index, Web availability <http://techinfo.honda.com/rjanisis/pubs/OM/JA0606/JA0606N00137A.pdf> Web Archive from Sep. 5, 2012 <https://web.archive.org/web/*/http://techinfo.honda.com/rjanisis/pubs/OM/JA0606/JA0606N00137A.pdf>.*

(Continued)

*Primary Examiner* — Paras D Shah
*Assistant Examiner* — Oluwadamilola M Ogunbiyi
(74) *Attorney, Agent, or Firm* — Morrison & Foerster LLP

(57) ABSTRACT

A method, device, system, and computer medium for providing interactive advertising are provided. For example, a device may request an advertisement from a remote server, receive the advertisement, receive a response from a user who is listening and/or watching the advertisement, and transmit the response to the server for further action. The user may input a response by speaking. A server may receive an advertisement request from the device, select an advertisement based on pre-defined one or more criteria, transmit the selected advertisement to the device for play, receive from the device a response to the selected advertisement, and then perform an action corresponding to the received response.

22 Claims, 10 Drawing Sheets

(51) Int. Cl.
*G06Q 30/02* (2012.01)
*G10L 15/22* (2006.01)

(52) U.S. Cl.
CPC .......... *G06Q 30/0277* (2013.01); *G10L 15/26* (2013.01); *G10L 2015/223* (2013.01)

(58) Field of Classification Search
USPC ................................................ 704/235, 246
See application file for complete search history.

(56) References Cited

U.S. PATENT DOCUMENTS

| | | | |
|---|---|---|---|
| 5,842,168 A * | 11/1998 | Miyazawa | G10L 15/26 704/244 |
| 6,516,349 B1 | 2/2003 | Lieberman | |
| 6,526,335 B1 | 2/2003 | Treyz et al. | |
| 6,708,176 B2 | 3/2004 | Strunk et al. | |
| 6,850,252 B1 | 2/2005 | Hoffberg | |
| 6,868,384 B2 | 3/2005 | Parus et al. | |
| 6,973,428 B2 | 12/2005 | Boguraev et al. | |
| 7,283,850 B2 * | 10/2007 | Granovetter et al. | 455/570 |
| 7,856,248 B1 * | 12/2010 | Fujisaki | 455/556.1 |
| 8,121,896 B1 * | 2/2012 | Lagassey | 705/14.4 |
| 8,234,119 B2 | 7/2012 | Dhawan et al. | |
| 8,428,944 B2 | 4/2013 | Poultney et al. | |
| 8,752,083 B2 | 6/2014 | Geer, III et al. | |
| 9,552,816 B2 | 1/2017 | VanLund et al. | |
| 2002/0038597 A1 | 4/2002 | Huopaniemi et al. | |
| 2002/0068525 A1 * | 6/2002 | Brown | G06Q 20/108 455/3.01 |
| 2002/0083060 A1 | 6/2002 | Wang et al. | |
| 2003/0014436 A1 | 1/2003 | Spencer et al. | |
| 2003/0046244 A1 | 3/2003 | Shear et al. | |
| 2003/0125958 A1 * | 7/2003 | Alpdemir | G10L 15/26 704/275 |
| 2004/0024688 A1 | 2/2004 | Bi et al. | |
| 2004/0054923 A1 | 3/2004 | Seago et al. | |
| 2004/0260562 A1 * | 12/2004 | Kujirai | G01C 21/3608 704/275 |
| 2005/0203992 A1 | 9/2005 | Tanaka et al. | |
| 2005/0227674 A1 | 10/2005 | Kopra et al. | |
| 2006/0026629 A1 | 2/2006 | Harris et al. | |
| 2006/0041926 A1 | 2/2006 | Istvan et al. | |
| 2006/0085521 A1 * | 4/2006 | Sztybel | H04L 67/22 709/219 |
| 2006/0200348 A1 | 9/2006 | Knott et al. | |
| 2007/0113243 A1 * | 5/2007 | Brey | G06Q 30/02 725/32 |
| 2007/0124507 A1 | 5/2007 | Gurram et al. | |
| 2007/0127640 A1 * | 6/2007 | Brunel | 379/88.13 |
| 2007/0220550 A1 | 9/2007 | Ljungman et al. | |
| 2007/0249330 A1 * | 10/2007 | Cortegiano | G06Q 30/0207 455/414.2 |
| 2008/0021790 A1 * | 1/2008 | Brown | G06Q 20/04 705/24 |
| 2008/0119167 A1 * | 5/2008 | Rao | 455/411 |
| 2008/0130554 A1 * | 6/2008 | Gisby et al. | 370/328 |
| 2008/0147412 A1 | 6/2008 | Shaw et al. | |
| 2008/0152126 A1 * | 6/2008 | Pitkamaki et al. | 379/418 |
| 2008/0320512 A1 | 12/2008 | Knight | |
| 2009/0006191 A1 * | 1/2009 | Arankalle | G06Q 30/02 705/14.71 |
| 2009/0076821 A1 | 3/2009 | Brenner et al. | |
| 2009/0100340 A1 * | 4/2009 | Paek | G06F 17/30899 715/728 |
| 2009/0210795 A1 * | 8/2009 | Katsuranis | 715/728 |
| 2009/0222341 A1 * | 9/2009 | Belwadi | G06Q 30/02 705/14.53 |
| 2009/0248419 A1 * | 10/2009 | Spaulding | G10L 21/10 704/275 |
| 2009/0320059 A1 * | 12/2009 | Bolyukh | H04H 20/106 725/32 |
| 2010/0185512 A1 * | 7/2010 | Borger | G06Q 30/02 705/14.49 |
| 2010/0222957 A1 * | 9/2010 | Ohta | B60K 35/00 701/31.4 |
| 2011/0078740 A1 * | 3/2011 | Bolyukh | H04N 5/44543 725/41 |
| 2011/0093884 A1 | 4/2011 | Wachtfogel et al. | |
| 2011/0102161 A1 | 5/2011 | Heubel et al. | |
| 2011/0223893 A1 | 9/2011 | Lau et al. | |
| 2011/0231252 A1 | 9/2011 | Sattaru | |
| 2011/0288913 A1 | 11/2011 | Waylonis et al. | |
| 2012/0112995 A1 * | 5/2012 | Maeda | G06F 3/017 345/156 |
| 2012/0272262 A1 | 10/2012 | Alexander et al. | |
| 2013/0080194 A1 | 3/2013 | Im et al. | |
| 2013/0316828 A1 * | 11/2013 | Ur | A63F 13/10 463/37 |
| 2013/0317823 A1 | 11/2013 | Mengibar | |
| 2014/0031960 A1 | 1/2014 | Hill | |
| 2014/0068648 A1 | 3/2014 | Green et al. | |
| 2014/0092007 A1 | 4/2014 | Kim et al. | |
| 2014/0207468 A1 | 7/2014 | Bartnik | |
| 2014/0330559 A1 | 11/2014 | Higbie et al. | |
| 2015/0113094 A1 | 4/2015 | Williams et al. | |
| 2016/0098998 A1 | 4/2016 | Wang et al. | |
| 2016/0180853 A1 | 6/2016 | VanLund et al. | |

FOREIGN PATENT DOCUMENTS

| | | | |
|---|---|---|---|
| CN | 101990678 | 3/2011 | |
| EP | 2200021 A1 * | 6/2010 | ......... G01C 21/3608 |
| WO | WO-00/22609 | 4/2000 | |
| WO | WO-02/11120 | 2/2002 | |

OTHER PUBLICATIONS

"Nuance Unveils Voice Ads: A Game Changer in Interactive Advertising," located at, <http://www.nuance.com/company/news-room/press-releases/voiceads.docx> visited on Aug. 14, 2013. (5 pages).

International Search Report and Written Opinion dated Sep. 25, 2014, directed to International Application No. PCT/US2014/036449; 17 pages.

Higbie et al., Office Action dated Apr. 9, 2015, directed to U.S. Appl. No. 13/875,887; 23 pages.

Higbie et al., U.S. Advisory Action dated Mar. 31, 2016, directed to U.S. Appl. No. 13/875,887; 4 pages.

Higbie et al. U.S. Office Action dated Jan. 3, 2017, directed to U.S. Appl. No. 14/880,084; 26 pages.

International Search Report and Written Opinion dated Jan. 11, 2017, directed to International Application No. PCT/US2016/056134; 12 pages.

Higbie et al., U.S. Office Action dated Nov. 17, 2015, directed to U.S. Appl. No. 13/875,887; 17 pages.

European Search Report dated Nov. 24, 2016, directed to European Application No. 14792244.7; 9 pages.

Notification of the first Office Action dated Feb. 2, 2018, directed to Chinese Application No. 201480033342.1, 20 pages.

Higbie et al., U.S. Office Action dated Jun. 8, 2017, directed to U.S. Appl. No. 13/875,887; 17 pages.

Higbie et al. U.S. Office Action dated Jul. 6, 2017, directed to U.S. Appl. No. 14/880,084; 36 pages.

Higbie et al., U.S. Office Action dated Apr. 4, 2018, directed to U.S. Appl. No. 13/875,887; 19 pages.

\* cited by examiner

FIG. 10

VOICE-BASED INTERACTIVE CONTENT AND USER INTERFACE

CROSS REFERENCE TO RELATED APPLICATION

This application is a continuation of U.S. patent application Ser. No. 13/875,887, filed May 2, 2013, the contents of which is incorporated herein by reference in its entirety.

FIELD OF THE INVENTION

The present invention relates to a device, system, method, and computer-readable medium for providing interactive advertising, and the following description is made with reference to this field of application for convenience of explanation only.

BACKGROUND OF THE INVENTION

Generally, interactive advertising refers to an advertising system implemented using online or offline interactive media to communicate with consumers and to promote products, brands, services, and public announcements, etc.

Interactive advertising may significantly increase the efficiency and success rate of advertising, compared to traditional advertising (e.g., one-way broadcasting advertising from advertiser to consumer), since the interactivity enables communications between consumers and advertisements.

Typically, the rate of users making an interaction with advertising content depends on the convenience or difficulty that the system achieves for users to interact with the advertising content.

For example, since it is easy for users operating a computer with a keyboard or mouse to input a response (e.g., click), the conventional interactive advertising primarily relies on the Internet advertisement environment where advertisement is played on a user's computer screen and the user interacts by physically operating the keyboard or mouse connected to the computer.

However, such a method may not be operative for some users, who are receiving advertisements through a medium that is not a computer device (e.g., audio-only advertisements, telephone, or radio advertisements). A similar problem exists with users who are not able to physically operate a keyboard or mouse because their hands are engaged in something else (e.g., driving).

Accordingly, improvements to the interactive advertising system that may increase the user-convenience in making interactions with the system have been sought in the relevant field of technology.

Also, further improvements to the interactivity in the system, for example, including, but not limited to, a variety of commands users may request, or a variety of actions the server may perform in response to the user's command, and a variety of selection criteria and/or information the advertisers may designate and store in the server, have also been sought in the relevant field of technology.

SUMMARY OF THE INVENTION

One of representative examples of a technological concept of embodiments described herein seek to solve, at least, the problems identified above while achieving further improvements to the interactivity of the system. The claimed contents of the present application are not limited to the technological concept described below, but are described in the claims of the present application.

Described are, among other things, systems, methods, and computer-readable mediums for providing interactive advertising, in which users may conveniently interact with the advertising content being played in real-time.

According to some embodiments of a communication device for providing interactive advertising, the communication device may comprise: a transmitter that transmits a content-request to a server connected to the device via a network; a receiver that receives a selected content from the server in response to the content-request; a player that plays the selected content; a voice-receiver that receives the user's spoken response made to the played content; and a command-phrase recognizer that associates the user's spoken response with a predetermined command phrase, the predetermined command phrase being associated with a predetermined action.

The transmitter may transmit the user's spoken response to the server. The transmitter may also transmit the action, the predetermined command phrase associated with the user's spoken response to the server.

The recognition of the user's spoken response may occur on the device, in which case the user's recognized response in a processed format may be transmitted by the device to the server, and/or the recognition of the user's spoken response may occur on the server, in which case the user's spoken response in a raw data format may be transmitted by the device to the server.

The content-request may not be generated by the user. The content-request may be generated automatically by the device as it realizes that it is approaching an advertising break-time.

The voice-receiver comprises a microphone that may be turned on only during a predetermined time, wherein the predetermined time is during or a selected time after the playing of the selected content.

The user's spoken response may be a fabricated word or phrase. The user's spoken response may be received in an audio format and converted into a text format, and the response in the text format may be displayed on a displaying unit of the device. The user's spoken response in the audio format may be transmitted to the server.

The device may convert the user's spoken response to text. The server may convert the user's spoken response to text.

One or more keywords may be used to associate the user's response with the predetermined command phrase.

The action to be performed by the device may include at least one of: automatically dialing a telephone number defined by the content received by the server, or determined based on the location of the user; automatically opening a webpage defined by the content received by the server, or determined based on the location of the user; receiving further input by the user; and downloading or installing an application on the device.

The device may be, at least, one of a cellphone, a tablet, a computer, an automobile stereo system, and a TV stereo system.

According to some embodiments of a server for providing interactive advertising, the server may comprise: a receiving unit that receives a content-request from a remote device connected via a network; a selection unit that selects content based on one or more characteristics associated with the content-request; and an execution unit that performs an action corresponding to a user's response to the selected content, wherein the receiving unit receives the user's response that is inputted by the user operating the remote device in an audio format.

The network may include HTTP Web-based Internet.

The user's response may be a fabricated word or phrase. The user's spoken response may be a brand name, a product name, a trademark, an oronym, or a homophone.

The one or more characteristics associated with the content-request may include at least one of: characteristics of the user operating the remote device such as user's age, gender, marital status, profession, place of residence, and current location; characteristics of the remote device such as the device type, network connection type, and microphone configuration; general characteristics such as time and weather; and characteristics of other applications being executed on the remote device.

The one or more characteristics associated with the content-request may include an application characteristic, the application being related to a publisher publishing regular content with an advertising break time.

The content may be selected based on both the one or more characteristics of the request and one or more target-audience characteristics that are pre-defined and stored in the server.

The server may further comprise a speech recognizer that associates the received user's response with a pre-defined command action phrase.

The action may include at least one of: sending an email to the user, the email containing information designated by the content; receiving a further user-response from the device; storing a user-response; sending a notification to a destination defined by the content; and executing a customized program.

The server may be configured to allow content-providers to generate a customized program whose execution is triggered by a user's response. The server may be configured to allow content-providers to access the server to change any characteristics and criteria information associated with the content.

According to some embodiments of a method for providing interactive advertising to a plurality of user devices, using a server, the method comprises: receiving by a processor a content-request from a remote device connected to the server via a network; selecting content based on one or more characteristics associated with the content-request; transmitting the selected content to the device; receiving a user's response from the device, the user's response being related to the selected content, the response being in an audio format; and performing a predetermined action corresponding to the received user's response.

The server may be further configured to perform: transmitting a uniform stream of advertising content to the plurality of user devices; receiving from the user devices one or more responses to the streamed advertising content; and transmitting different contents to at least two different user devices, based on their corresponding responses received by the server, wherein after the different contents are played on the user devices, the user devices are synchronically rejoined to a main stream of content transmitted by the server.

The server may be further configured to perform: transmitting a uniform stream of combined publisher content and advertising content to the plurality of user devices; receiving from the user devices one or more responses to the streamed advertising content; and transmitting different contents to at least two different user devices, based on their corresponding responses received by the server, wherein after the different contents are played on the user devices, the user devices are each independently rejoined to the stream at the point where it left off, utilizing a buffer to ensure the content is available (i.e. no content is missed).

The different contents may be pre-loaded on the user devices and may be played as a pre-roll base in response to an action taken by respective users operating the user devices.

In some embodiments, at least one of the plurality of user devices may be configured to perform: receiving by a processor content from a server connected to the device via a network, the content being selected by the server in response to a request by the device; playing the received content for a user; receiving by a microphone a response from the user, the response being related to the played content, and the response being made by the user's spoken response; associating the spoken response with a predetermined command phrase; determining an action corresponding to the predetermined command phrase; and transmitting the action and the user's spoken response, the command phrase, and/or the action to the server.

In some embodiments, at least one of the plurality of user devices may be configured to further perform: determining that the action requires a further response by the user; prompting the user to speak again; receiving by the microphone the user's further response; and transmitting the further response to the server.

The server may be configured to allow a content-provider to create or modify a command phrase associated with the content provided by the content-provider.

According to some embodiments of a system for providing interactive advertising, the system may include a server and a communication device operated by a user, and the communication device may comprise: a transmitter that transmits a content-request to a server connected to the device via a network; a receiver that receives a selected content from the server in response to the content-request; a player that plays the selected content; a voice-receiver that receives the user's spoken response made to the played content; and a command-phrase recognizer that associates the user's spoken response with a predetermined command phrase, the predetermined command phrase being associated with a predetermined action, wherein the transmitter transmits the user's spoken response to the server.

The server may comprise: a receiving unit that receives a content-request from a remote device connected via a network; a selection unit that selects content based on one or more characteristics associated with the content-request; and an execution unit that performs an action corresponding to a user's response to the selected content, wherein the receiving unit receives the user's response that is inputted by the user operating the remote device in an audio format.

The system may include a server and a plurality of communication devices each connected to the server via a network.

In some embodiments, one or more publisher applications may be operating on one or more user's devices, wherein the publisher application operating on the user's device may provide regular content for user that includes one or more advertising and/or commercial break times.

According to some embodiments of a non-transitory computer-readable medium storing a computer program for providing interactive advertising to be executed by a processor included in a communication-device, which, when executed, may cause the device to perform: receiving by a processor content from a server connected to the device via a network, the content being selected by the server in response to a request by the device; playing the received content for a user; receiving by a microphone a response from the user, the response being related to the played content, and the response being made by the user's spoken response; associating the spoken response with a predetermined command phrase; determining an action corresponding to the predetermined command phrase; and transmitting the action, the command phrase, and/or the user's spoken response to the server.

According to some embodiments of a non-transitory computer-readable medium storing a computer program for providing interactive advertising to be executed by a processor included in a server, which, when executed, may cause the server to perform: receiving by a processor a content-request from a remote device connected to the server via a network; selecting content based on one or more characteristics associated with the content-request; transmitting the selected content to the device; receiving a user's response from the device, the user's response being related to the selected content, the response being in an audio format; and performing a predetermined action corresponding to the received user's response.

BRIEF DESCRIPTION OF THE DRAWINGS

The characteristics and advantages of the device, system, method, and computer-readable medium for providing interactive advertising, will be explained with reference to the following description of embodiments thereof given by way of indicative and non-limiting examples with reference to the annexed drawings, in which:

FIG. 10 shows an example of a screenshot of a campaign manager application, in accordance with some embodiments described herein.

DETAILED DESCRIPTION OF THE INVENTION

Figure 1:
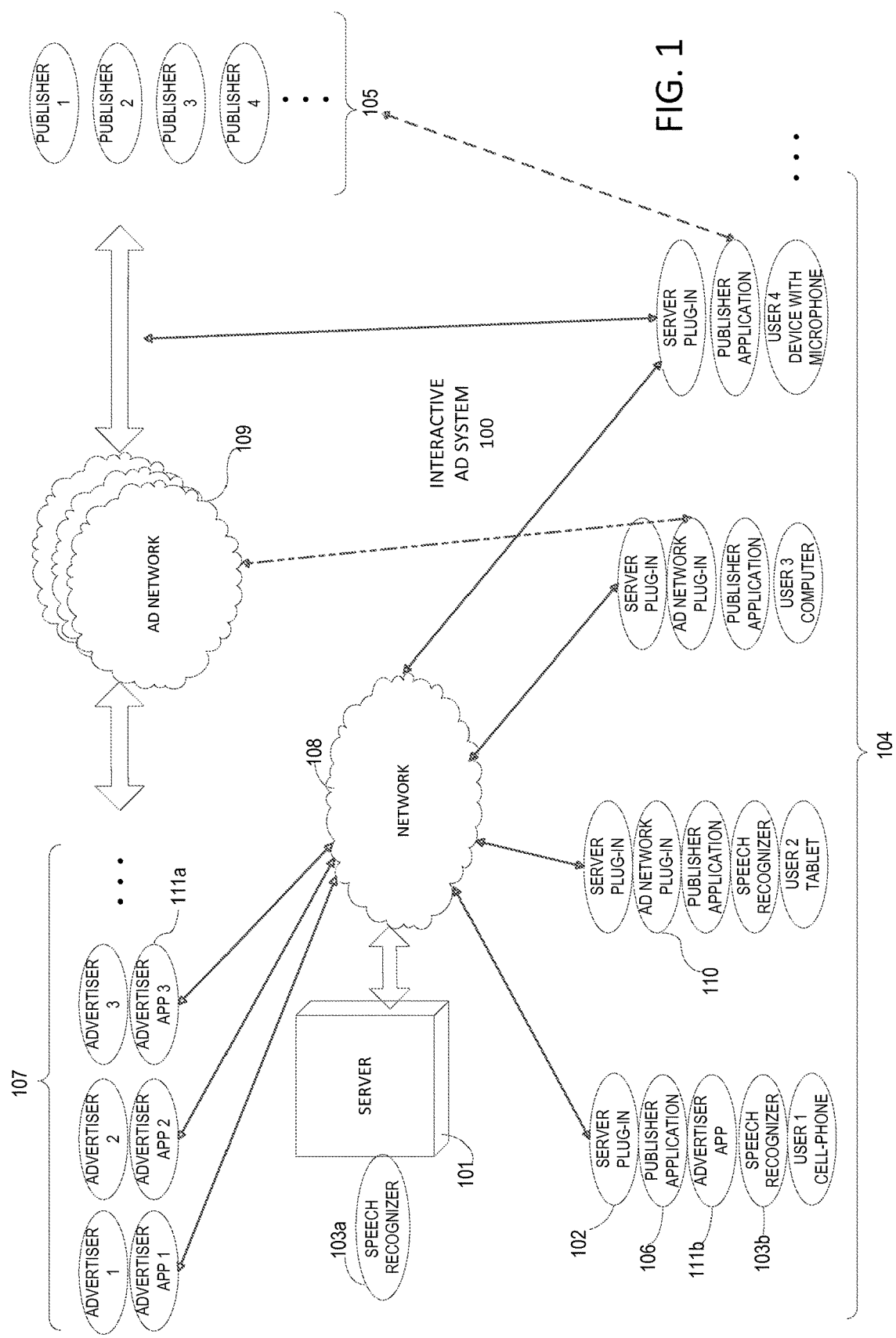
FIG. 1 schematically shows an example of a system that allows interactive advertising via a server, in accordance with some embodiments described herein.

The interactive advertising according to some embodiments described herein may include systems, methods, and computer-readable mediums for providing real-time interactivity to users to advertising content being broadcast or streamed through various communication media (e.g., radio, tv, internet, etc.). For example, the interactivity may be taken advantage of by advertising content providers to interact with potential customers in real-time.

One of representative examples of a technological concept of the present invention will be described more fully hereinafter with reference to accompanying drawings, in which illustrative embodiments of the present invention are shown. These examples may, however, be embodied in many different forms and should not be construed as limited to the embodiments set forth herein; rather, these embodiments are provided so that this disclosure will be thorough and complete, and will fully convey the scope of the claims to those skilled in the art. Like numbers refer to like elements throughout. As used herein, the term "and/or" incudes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the scope of the claimed subject matter.

The terminology used herein is for the purpose of describing particular embodiments only and is not intended to limit the claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

As will be appreciated by one of skill in the art, the claimed subject matter may be embodied as a method, device, data processing system, or computer program product. Furthermore, the claimed subject matter may take the form of a computer program product on a computer-usable storage medium having computer-usable program code embodied in the medium. Any suitable computer-readable medium may be utilized including hard disks, CD-ROMs, optical storage devices, a transmission media such as those supporting the Internet or an intranet, or magnetic storage devices.

Computer program code for carrying out operations of the embodiments of the claimed subject matter may be written in an object-oriented programming language such as Java®, Smalltalk or C++. However, the computer program code for carrying out operations of the embodiments of the claimed subject matter may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The claimed subject matter is described in part below with reference to flow chart illustrations and/or block diagrams of methods, apparatus (systems), and computer program products according to embodiments of the claimed subject matter. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flow chart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flow chart and/or block diagram block or blocks.

Several exemplary embodiments of the claimed subject matter will be described with respect to FIGS. 1-10 below. Embodiments provide methods, device, systems, and computer program products for providing interactive advertising. This effort may help users receive information that they want in real-time, receive only the information that they want without having to waste time in sorting through redundant or undesired information, and interact with the content of the advertisement in real-time by for example, requesting further information, sending feedback to the advertiser, purchasing the advertised item, etc. Further, this effort may help advertisers to identify the target audience for their advertisements and thereby increase the efficiency and efficacy of the advertisements.

FIG. 1 schematically shows an example of a system that allows interactive advertising via a server, in accordance with some embodiments described herein. System 100 includes a server 101, one or more advertisers 107, one or more publishers 105, and one or more users 104.

The publisher 105 may broadcast and/or stream content to users through various communication media (e.g., radio and/or tv communication media, Internet podcast media, or any equivalent thereof). The content usually includes audio data with or without the corresponding visual data. The user 104 is equipped with a device that may receive the content transmitted from the publisher.

The device has an input unit, for example, a microphone for receiving audio inputs. The microphone may be embedded in the device or externally connected to the device. There may be further input units for receiving various other forms of input data (e.g., text or selection from the list), including, but not limited to, a keyboard, a keypad, a joystick, a roller, a touch pad, a touch screen, or any equivalent thereof. In FIG. 1, the devices operated by the users may include a cellphone, a tablet, a computer, and a device with a connected microphone. Other examples of a user device may include, but not limited to, cars, TVs, stereo systems, etc.

Advertisers 107 are those that provide advertising content to publishers. In the system, the advertisers provide their advertising content to server 101 along with other target criteria information, and then the server 101 selects the appropriate content for each individual user 104 and transmits it to the corresponding user 104. Then, the user 104 that receives the content may interact with the advertiser 107, other content stored in the server, or any equivalent thereof, in real-time through server 101.

The multi-path communication through server 101 may be accomplished by using plug-in computer programs. A plug-in is a set of software components that provide specific abilities to a larger software application, and may enable customizing the functionality of an application. A plug-in computer program may be stored in and executed by a processor of the server 101, a device for the user 104, and/or a device for the publisher 105, to customize the functionality of the respective devices in the interactive advertising system 100.

For example, a server plug-in 102 may be stored in and executed by a processor of the device for user 104 such that the server plug-in 102 helps the user 104 to interact with the corresponding publisher 105 (e.g., through publisher's application), the server 101 through the network 108 (e.g., HTTP web-based Internet, any proprietary network, or any equivalent thereof capable of two-way communications) and/or the corresponding advertiser 107 through the server 101. The advertisers and users may use the same network to communicate with the server, or may use different networks to communicate with the server.

Similarly, a server plug-in 102 may be stored in and executed by a processor of the publisher 105 and/or of the advertiser 107 to customize the functionality of the publisher 105 and/or the advertiser 107 in the interactive advertising system 100, if necessary or beneficial.

In addition, a publisher application 106 may also be stored in and executed by the user's device to receive the content from the corresponding publisher. A server plug-in 102 may make the publisher application 106 and the interactive advertising system 100 compatible with the conventional broadcasting of the content from the publisher. The publisher application 106 may communicate and interact with the server 101 through a customized plug-in 102.

Each advertiser and/or user may run a separate advertiser application and/or a separate customized plug-in, or a plurality of advertisers and/or users may run a shared publication application through the network. In the exemplary system shown in FIG. 1, each advertiser 1-3 runs a separate advertiser application 111a that is configured to communicate with the server 101 and one or more users 104 through the network 108. The one or more users 104 may have installed on their devices a corresponding advertising application 111b.

The advertiser applications 111a/111b may provide significant extensibility to the capabilities of the overall interactive advertising system, for example, because they may be called and/or launched by users' commands or speaking of appropriate action phrases, including, but not limited to, "call now," "buy it," "go to," or any other phrases that may be additionally or alternatively implemented in the system.

When the advertiser applications 111a/111b are called or launched, they may provide a wide range of functionalities customized to the corresponding advertiser, including, but not limited to: mobile interactive voice response (IVR), call routing, voice or touch mobile purchases, voice or touch order fulfillment, voice or touch customer feedback, voice or touch customer service, voice web-site access, etc.

Advertisers 107 may provide advertising content to users through ad network(s) 109. Ad network plug-in(s) 110 may be embedded in the corresponding publisher application 106 to provide the content to the users. Then, the server plug-in 102 that is configured to communicate with the server 101 through the network 108 may be embedded in the ad network plug-in 110 such that the user may interact with the advertising content provided by the advertiser 107 through ad network(s) 109.

Users 104 may interact with the advertising content as they receive it from the publishers 105 by inputting commands (e.g., audio command, text command, selection command, or any equivalent thereof) using the input unit(s) of the device. In particular, the description herein may emphasize the user's interaction by audio commands, but a similar concept may apply to other schemes without departing from the core idea and spirit of the claims.

As the user 104 receives the advertising content from the publisher 105, the user may input an audio command, for example, requesting more information about the item, requesting to purchase the item, or requesting to provide feedback to the advertiser, etc.

Figure 9:
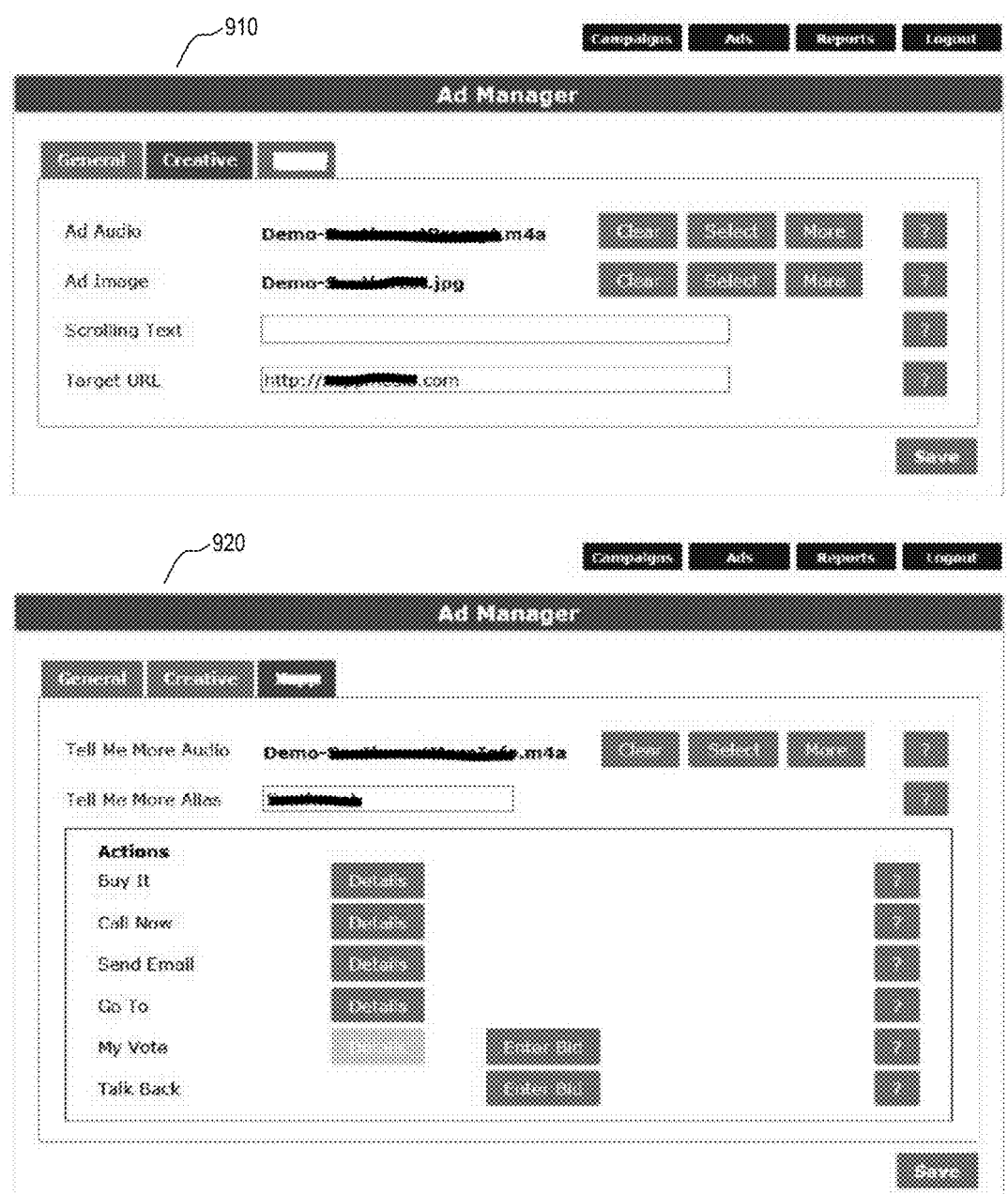
FIG. 9 shows an example of a screenshot of an ad manager application, in accordance with some embodiments described herein.

These requests are provided herein only as examples, and more commands may be made available through a simple modification to the system as will be apparent to one of ordinary skill in the art. In particular, the command list may be dynamically defined, and the command definitions may leverage native capabilities on the corresponding device, such as, non-exclusively, dialing a number, initiating a SKYPE session, opening a web page, downloading and/or installing an application, playing an audio file, etc. In fact, the interactive advertising platform (system) may allow users, advertisers, publishers, or any relevant entities in the interactive advertising market to dynamically define the commands to take advantage of any native device capabilities with use of a simple application such as, non-exclusively, an advertiser mini-application, an ad manager web-page/application, etc. An exemplary screenshot of an ad manager application is shown in FIG. 9.

Additionally or alternatively, the platform may also allow advertisers, publishers, and/or any relevant entities in the interactive advertising market to hook in their own server-side logic via the network (e.g., web service notifications) to customize the interactive advertising system according to their specific needs.

The user's audio command is then recognized by a speech recognizer (VR), which may be implemented on the user's device as shown in the speech recognizer 103b in FIG. 1, or may be implemented on the server's side as shown in the speech recognizer 103a in FIG. 1. The speech recognizer 103a/103b may process the user's audio. Optionally, it may also return the corresponding text version to the user. Further, the server plug-in 102 then may process the recognized user's response—for example, if the user's recognized response calls for a 'call-now' action, the server plug-in 102 may get the corresponding advertiser's phone number from the server 101 and cause the user's device to initiate automatic calling of the advertiser's number.

In another example, the user's recognized response may call for providing feedback to the advertiser 107, in which case the server plug-in 102 resets the VR 103a/103b to listen to the user's feedback, the VR 103a/103b processes the user's feedback and returns the feedback to the server 101, and then the server 101 may send the feedback to the corresponding advertiser 107, or otherwise make it available for access by the corresponding advertiser 107. Further actions and commands will be described below with reference to other figures.

The publisher application 106 may be installed on the user's device or any device with a processor capable of executing the publisher application 106, and may be used to broadcast and/or stream the content provided by the corresponding publisher 105 on the user's device 104. In FIG. 1, the users 1-4 each run a publisher application on their corresponding devices, i.e., a cell-phone, a tablet, a computer, and a device with microphone. As previously noted, the user devices may also include cars, TVs, stereo systems, or any equivalent device with audio functionalities.

The server plug-in 102 may be installed on the user's device or any device with a processor capable of executing the server plug-in 102, and may be used to communicate with the server 101. The server plug-in 102 may or may not provide the speech recognizer to the user device on which it is installed. If it does not provide the speech recognizer to the user device, the speech recognizer on the server's end, 103a, may instead be used. Further, the server plug-in 102 may be embedded directly in the publisher application 106, in which case the advertisers 107 are connected to the publishers 105 and ultimately to users 104 through the network 108, and/or embedded in the ad network plug-in 110, in which case the advertisers 107 are connected to the publishers 105 and ultimately to users 104 through either or both the ad network 109 and the network 108.

For example, for user 1 in FIG. 1, the server plug-in 102 is embedded in the publisher application 106, and provides the speech recognizer 103b to the user device. For user 2, the server plug-in 102 is embedded in the ad network plug-in 110, which is then embedded in the publisher application 106, and also provides the speech recognizer 103b to the user device. For user 3, the server plug-in 102 is embedded in the ad network plug-in 110, which is then embedded in the publisher application 106, but does not provide the speech recognizer to the user device. For user 4, the server plug-in 102 is embedded in the publisher application 106 that does not run an ad network plug-in, and does not provide the speech recognizer to the user device.

Accordingly, the server plug-in 102 operating on the user devices 2 and 3 with the ad network plug-in 110 may receive advertising content and otherwise communicate and/or interact with the advertisers 107 through either or both the ad network 109 and the network 108 that includes the server 101. Further, the server plug-in 102 operating on the user devices 3 and 4 may recognize the user's spoken response through the speech recognizer 103a implemented on the server 101.

Once the speech recognizer 103a/103b processes the recognition of the user's audio command, then the server 101 may operate in an interactive manner in response to the recognized command, including, for example, initiating an action in response to an action by another component. Examples of the processing flow in each of these components will be described below, but any obvious modification to these examples may be made to satisfy any specific technical and design needs of an interactive advertising system as will be apparent to one of ordinary skill in the art.

Further, the publisher application 106, plug-in 102 and/or voice-recognizer (VR) 103 may be customized or modified, separately or in combination, depending on each user 104 (e.g., specific characteristics of the user's device). For example, different techniques may be configured to recognize the user's spoken response and/or audio command based on the microphone configuration in use (e.g., headset, Bluetooth, external, etc.).

Figure 2:
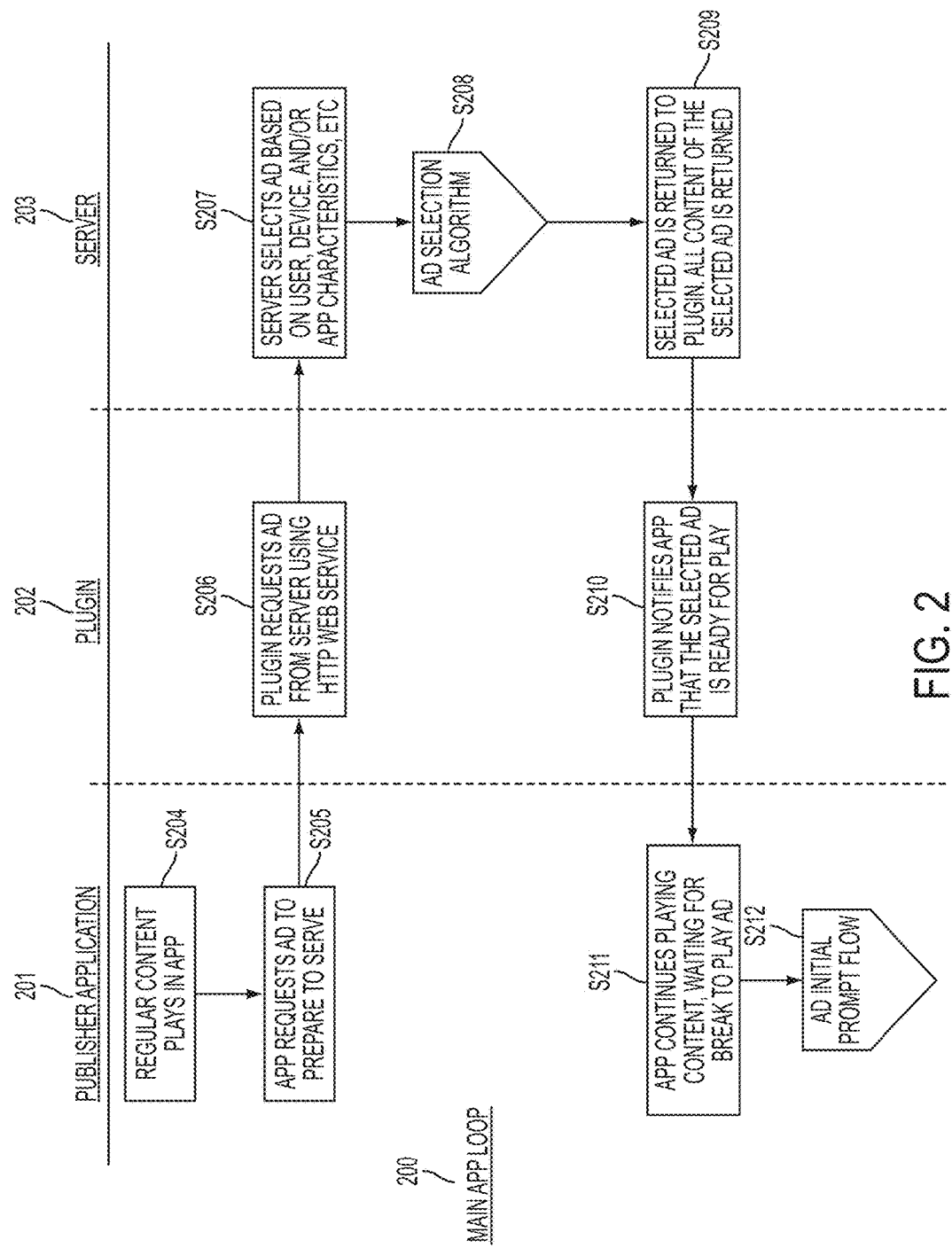
FIG. 2 shows an example of a main loop processing flow chart that may apply to the interactive advertising system 100 shown in FIG. 1, in accordance with some embodiments described herein.

FIG. 2 shows an example of a main loop processing flow chart that may apply to the interactive advertising system 100 shown in FIG. 1, in accordance with some embodiments described herein. A publisher application 201 may be used to implement the publisher application 106 in the interactive advertising system 100 shown in FIG. 1.

A plug-in 202 may be used to implement the customized plug-in 102 in the interactive advertising system 100 shown in FIG. 1. A server 203 may be used to implement the server 101 in the interactive advertising system 100 shown in FIG. 1.

In the exemplary main loop processing flow 200 shown in FIG. 2, the publisher application 201 initially plays the regular content, represented in step S204. The regular content may include any broadcast and/or streamed content, including, but not limited to, radio content, IP radio content, tv content, etc. At S205, before reaching the predetermined break time for advertisements, the publisher application 201 requests advertising content to prepare to serve to the user(s). The content-request may be automatically generated by the publisher's application and not generated or prompted by the user.

Additionally or alternatively, the publisher's application may generate a content-request for a certain type of advertising content based on one or more user actions or characteristics (e.g., a certain action by user, or certain characteristics of the pre-stored settings in the user's device, may trigger the plug-in in the user's device to select sports-related content over food-related content, etc.). Examples of such user actions or characteristics may include, but not limited to, a spoken or written command, a prompt by clicking a button, a record of frequently visited web-pages stored in the device, a record of previously played advertising contents that were acted upon by the user, etc.

At S206, the request from the publisher application 201 is transmitted to the server 203 by the plug-in 202 using the HTTP web service. At S207, upon receiving the advertising-content request, the server 203 selects an appropriate advertising content for that particular request. The selection may be made based on various characteristics, including, but not limited to, the characteristics of the recipient-user of the content from the requestor-publisher application, the associated user device, and/or the publisher application, the time, the weather of the day, or the area associated with the user device, etc.

The advertising-content selection may be implemented using one or more computer program algorithms, for example, by giving different cut-offs for each characteristic, putting different weight on each characteristic, or any other ways to filter and select the target advertisement for the user as will be apparent to one of ordinary skill in the art. Further, the server 203 may be configured to apply different algorithms based on a certain characteristics of the user, user-device, publisher application, and/or the advertiser. An algorithm may be pre-defined, or may be customizable for each advertiser such that the advertiser can select a target audience and decide how the server can select the target audience. An example of the ad selection algorithm that may be used in S208 is explained below with reference to FIG. 6.

At S209, the selected advertising content is transmitted from the server to the plug-in 202. The content of the selected advertisement as previously provided from the advertiser and stored in the server is transmitted.

At S210, the plug-in 202, after receiving the selected advertising content from the server 203, notifies the publisher application 201 that the advertisement is ready for play.

At S211, after receiving the ready-sign from the plug-in 202, the publisher application 201 continues the playing of the regular content while waiting for an advertisement break, and plays the advertising content received from the server 203 during the advertisement break.

At S212, as the advertisement break starts, and consequently, the selected advertising content is ready to be played, a different processing flow (e.g., ad initial prompt processing flow) starts to run on the associated components. An example of such an ad initial prompt processing flow is shown in FIG. 3.

Figure 3:
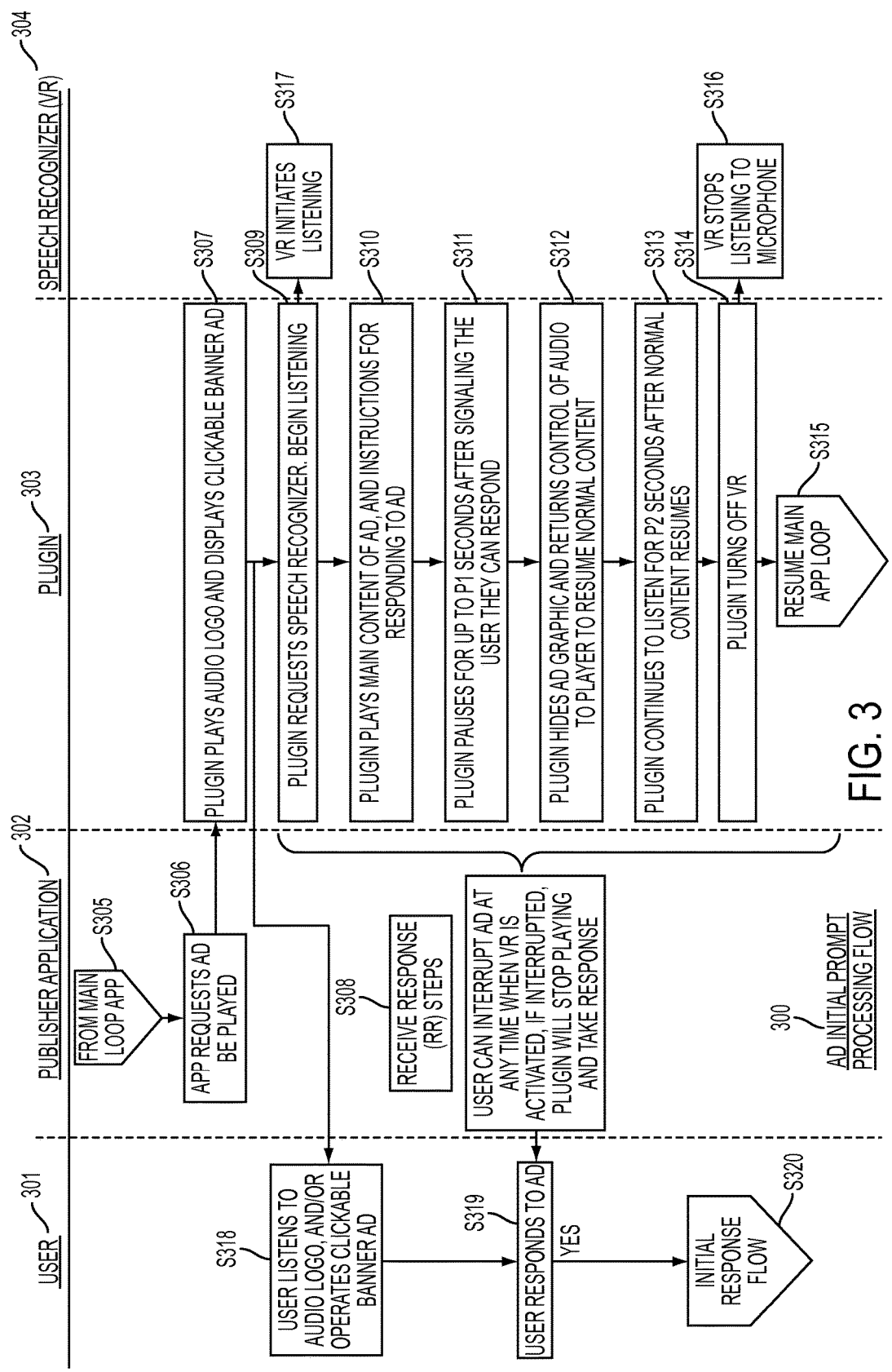
FIG. 3 schematically shows an example of an ad initial prompt processing flow chart that may apply to step S212 in FIG. 2, in accordance with some embodiments described herein.

FIG. 3 schematically shows an example of an ad initial prompt processing flow chart that may apply to step S212 in FIG. 2, in accordance with some embodiments described herein. User 301 may correspond to the user 104 in the interactive advertising system 100 shown in FIG. 1.

The publisher application 302 may be used to implement the publisher application 106 in the interactive advertising system 100 shown in FIG. 1. The plug-in 303 may be used to implement the plug-in 102 in the interactive advertising system 100 shown in FIG. 1. The speech recognizer (VR) 304 may be used to implement the VR 103 in the interactive advertising system 100 shown in FIG. 1. Further, if the processing flow of FIG. 3 applies to step S212 in FIG. 2, the publisher application 302 may correspond to the publisher application 201 in FIG. 2, and the plug-in 303 may correspond to the plug-in 202 in FIG. 2.

The ad initial prompt processing flow 300 may be executed during an advertisement break time in the regular content broadcast from the publisher and received by the user's device through the publisher application 302.

At S305, the system transitions from the main loop processing flow 200 to the ad initial prompt processing flow 300 as the advertisement break time starts. As previously noted with reference to FIG. 2, before the advertisement break time starts, the plug-in already completes the requesting and receiving of the advertisement selected and transmitted by the server as well as its corresponding advertising content. This advertising content may be locally stored to be ready for service or play.

At S306 and S307, when the publisher application 302 sends a cue sign, i.e., requests the on-hold selected advertising content to be played, the plug-in 303 plays the advertising content. If the content includes both audio and visual data, the plug-in 303 plays both the audio and visual data on the user's device.

Further, the plug-in 303 may cause the user's device to display clickable banner ads corresponding to the content being played. Accordingly, the user may listen and/or see the advertising content.

At S309, as soon as the advertising content starts being played, the plug-in 303 also sets the speech recognizer (VP) 304 to a ready-state. The VP 304 is switched to an on state, ready to listen to the user's audio command, as represented in step S317. Further, as soon as the VP 304 is activated, the user can interrupt the advertising content being played at any time and input an audio command. For example, if the user makes a noise with sufficient decibels to be recognized as an audio input, the plug-in 303 will stop playing the advertising content, and then the VR 304 will take the user's audio command and process it. This is represented as the 'receive response' step(s) at S308.

At S310, the plug-in 303 plays the main content of the advertisement and subsequently plays the pre-recorded instructions for users on how to respond to the advertisement.

At S311, after the instructions have been played, the plug-in 303 plays a signal to the user and pauses for up to a predetermined number of seconds, e.g., P1 seconds, after the signal. P1 may be any value near three (3), including, but not limited to, 1, 1.5, 2, 2.5, 3.5, 4, 4.5, or any other non-negative value. At S312, after the P1 seconds, the plug-in 303 removes or hides the visual/graphic data of the advertising content (e.g., the graphic banner advertisement) and returns control of the audio to the device/player so that the regular content (e.g., from the publisher application) is resumed.

At S313, even after the regular content is resumed, the plug-in 303 can still receive the user's audio commands for up to a predetermined number of seconds, e.g., P2 seconds. P2 may be any value near five (5), including, but not limited to, 2, 2.5, 3, 3.5, 4, 4.5, 5.5, 6, 6.5, 7, 7.5, or any other non-negative value. These predetermined parameters P1 and P2 may each have a default value but may also be modified by the user, user's device, plug-in, publisher application, server, and/or the creator of the advertising content such as the advertiser.

At S314, after P2 seconds, the plug-in 303 turns off the speech recognizer (VR) 304, and then the VR 304 stops listening to the microphone of the user's device, as represented in step S316. Then, at S315, after the plug-in 303 has turned off the VR, the main loop processing flow may resume.

Further, immediately after the step S307 when the plug-in 303 starts playing the audio portion of the advertising content as well as displaying the visual portion of the advertising content on the user's device, the user may make a response at any time by inputting either or both of the audio command, text command, selection command, or any equivalent thereof, as represented in step S318 in FIG. 3.

At S319, if the user inputs a response to the advertising content, an initial response processing flow starts, as represented in step S320. The user may input a response at times defined in steps S308-S314. If the user does not input any response, the main app loop may resume, as represented in step S315.

Figure 4:
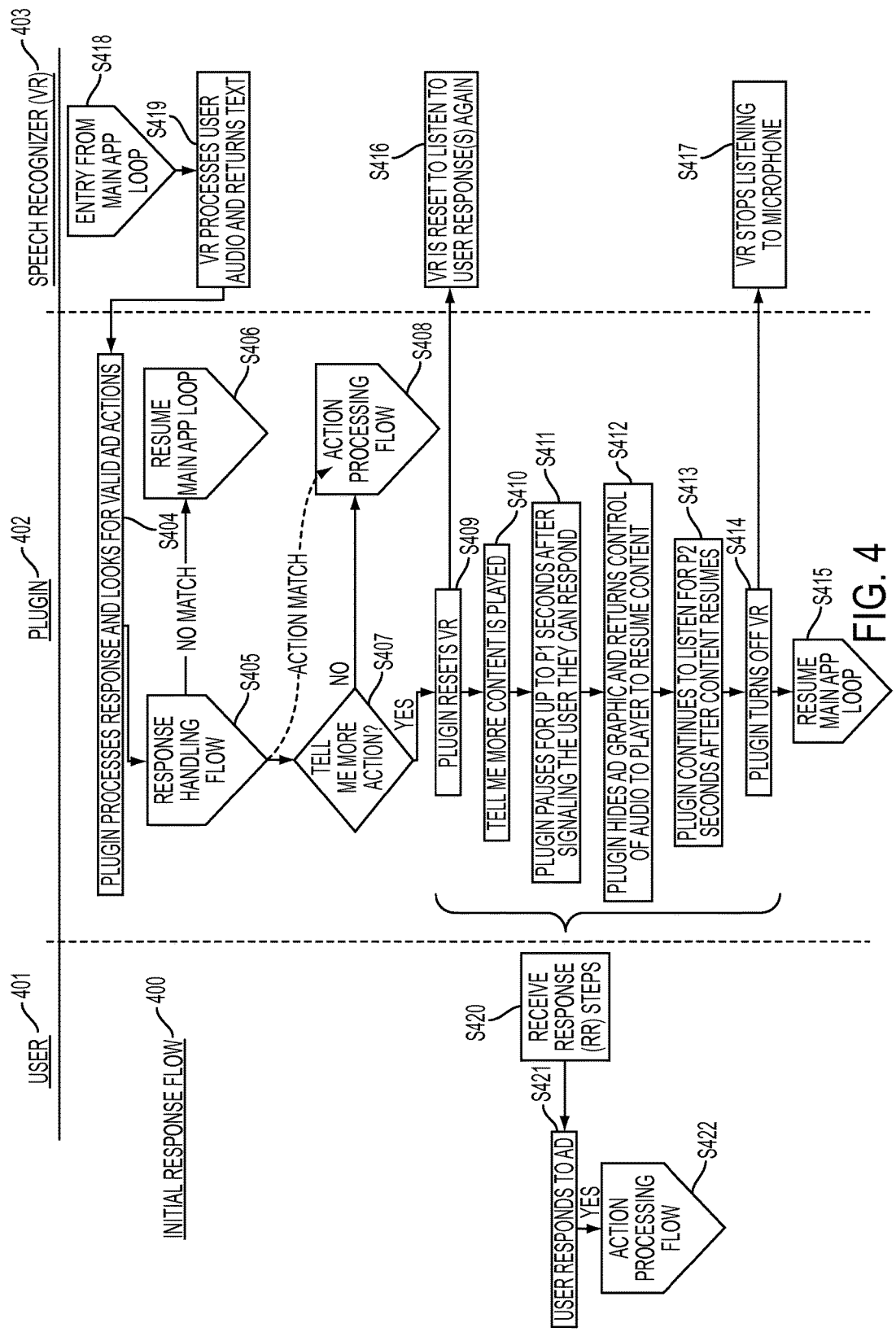
FIG. 4 schematically shows an example of an initial response processing flow chart that may apply to step S320 in FIG. 3, in accordance with some embodiments described herein.

FIG. 4 schematically shows an example of an initial response processing flow chart that may apply to step S320 in FIG. 3, in accordance with some embodiments described herein. In previous steps, the speech recognizer (VR) has received the user's audio command. FIG. 4 shows an exemplary processing flow chart for processing such a response inputted by the user and recognized by the VR.

The processing of the response may be done by the VR and/or the plug-in.

In the example shown in FIG. 4, user 401 may correspond to the user 104 in the interactive advertising system 100 in FIG. 1, plug-in 402 in FIG. 4 may correspond to the plug-in 103 in FIG. 1, and voice-recognizer (VR) 403 in FIG. 4 may correspond to the speech recognizer (VR) 103 in FIG. 1.

Further, the initial response processing flow 400 shown in FIG. 4 may apply to step S320 in FIG. 3 in which case the user 401 in FIG. 4 may correspond to the user 301 in FIG. 3, the plug-in 402 in FIG. 4 may correspond to the plug-in 303 in FIG. 3, and the VR 403 in FIG. 4 may correspond to the VP 304 in FIG. 3.

The initial response processing flow chart shown in FIG. 4 starts with step S418 representing a transition from the main app loop to a state where the user inputs a command which is recognized by the device. Specifically, at S419, the VP 403 recognizes the user's audio input command, processes it, and may return a corresponding text command to the user for, for example, confirmation. Also, the VR 403 transmits the command to the plug-in 402 for further processing, as shown in step S404.

At S404, the plug-in 402 processes the response (e.g., the response recognized by the VR 403 if the response was audio command inputted by microphone, or the response inputted by other input units such as touch pad, keyboard, etc.) and searches for a valid advertisement action (hereinafter, "ad action") corresponding to the response.

For example, there may be provided a correspondence table matching a certain response to a certain action. Such a correspondence table may be pre-stored in the server such that the plug-in may pull the necessary data in relation to the response being processed in real-time through the network, or may be pre-stored locally in the user's device for, for example, faster operations.

The searching for the valid ad action may be implemented through a dedicated algorithm such as a response handling processing flow shown in step S405 in FIG. 4. If the plug-in 402 decides that there is no pre-determined ad action for the recognized response (i.e., "no match" case), then the main app loop may resume as shown in step S406. On the other hand, if there is a valid ad action (i.e., "action match" case), then the plug-in 402 starts an action processing flow, as represented in step S408.

However, if the matched ad action requires receiving more of a response from the user (such as get feedback, etc.), as represented in step S407, then the plug-in 402 and the VR 403 initiate the "receive response (RR)" steps as represented in step S420.

More specifically, at step S409, after the plug-in 402 has decided that the matched ad action requires receipt of further user response, the plug-in 402 resets the VR 403, which turns on the VR to be ready to listen to the microphone of the user's device, as represented in step S416.

As indicated in step S420 and in similar step S308 shown in FIG. 3, as soon as the VR 403 is activated in step S416, the user can interrupt the content being played at any time and input an audio command, which includes the times during which the "tell me more" content is being played, e.g., step S410. For example, if the user makes an utterance with sufficient decibels to be recognized as an audio input, the plug-in 402 will stop playing the "tell me more" content, and simultaneously the VR 403 will accept the user's utterance as an audio command, in other words, the user may 'barge-in' to input an audio command while the content is being played. The user may also input a response at times defined in steps S409-S414 as will be explained below.

At S410, the pre-stored "tell me more" content is played on the user's device. Such a "tell me more" content may be pre-stored in the server such that the plug-in 402 may pull the necessary data in relation to the response being processed in real-time through the network, or may be pre-stored locally in the user's device for, for example, faster operations.

At S411, after the "tell me more" content has been played, the plug-in 402 makes a signal to the user 401 indicating that the user may respond now and pauses for up to P1 seconds after the signal.

At S412, after the P1 seconds have passed, the plug-in 402 removes or hides the visual/graphic data of the "tell me more" content and returns control of the audio to the device/player so that the regular content (e.g., from the publisher application) is resumed.

At S413, even after the regular content is resumed, the plug-in 402 can still receive the user's audio commands for up to P2 seconds.

At S414, after P2 seconds have passed, the plug-in 402 turns off the speech recognizer (VR) 403, and then the VR 403 stops listening to the microphone of the user's device, as represented in step S417. At S415, after the plug-in 402 has turned off the VR 403, the main loop processing flow may resume. These predetermined parameters P1 and P2 may each have a default value but may also be modified by the user, user's device, plug-in, publisher application, server, and/or the creator of the advertising content such as the advertiser.

Further, immediately after the step S407 when the plug-in 402 starts playing the audio portion of the "tell me more" content as well as displaying the visual portion of the "tell me more" content on the user's device, the user may make a response at any time by inputting either or both the audio command, text command, selection command or any equivalent thereof, as represented in step S420 in FIG. 4.

At S421, if the user inputs a response to the advertising content, an action processing flow starts, as represented in step S422. If the user does not input any response, the main app loop may resume, as represented in step S415.

As noted above, an action processing flow may occur when user's inputted response has a matching valid action, and the associated components in the system (e.g., plug-in, server, application, advertiser, etc.) execute the action processing flow to actually perform the matching valid action. An example of such an action processing flow is shown in FIG. 5.

Figure 5:
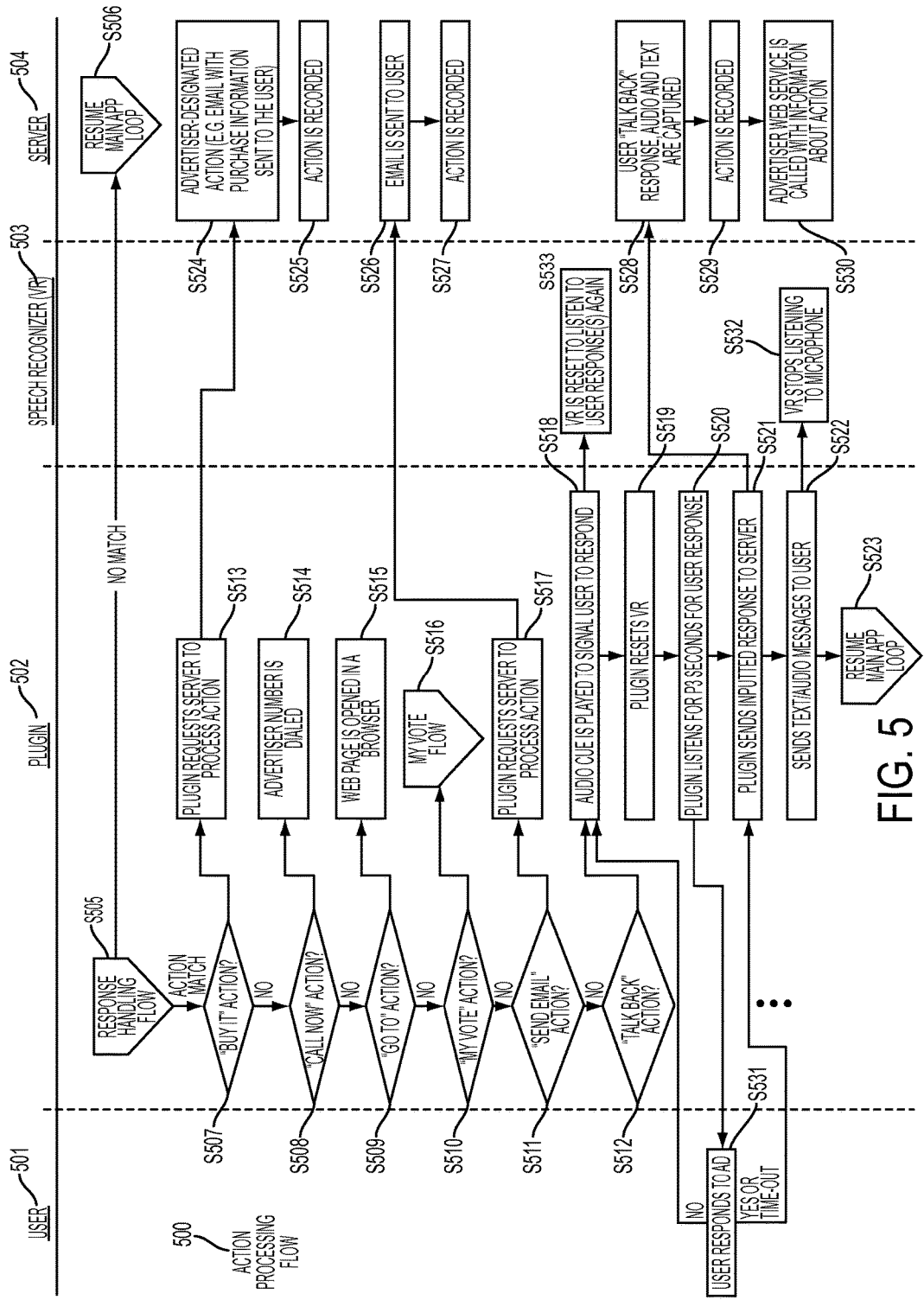
FIG. 5 schematically shows an example of an action processing flow chart that may apply to, for example, step S422 and/or S408 in FIG. 4, in accordance with some embodiments described herein.

FIG. 5 schematically shows an example of an action processing flow chart that may apply to, for example, step S422 and/or S408 in FIG. 4, in accordance with some embodiments described herein. In the example shown in FIG. 5, user 501 may correspond to the user 104 in the interactive advertising system 100 in FIG. 1, plug-in 502 in FIG. 5 may correspond to the plug-in 102 in FIG. 1, voice-recognizer (VR) 503 in FIG. 5 may correspond to the speech recognizer (VR) 103 in FIG. 1, and server 504 in FIG. 5 may correspond to the server 101 in FIG. 1.

Further, the action processing flow 500 shown in FIG. 5 may apply to step S422 and/or S408 in FIG. 4, in which case the user 501 in FIG. 5 may correspond to the user 401 in FIG. 4, the plug-in 502 in FIG. 5 may correspond to the plug-in 402 in FIG. 4, and the VR 503 in FIG. 5 may correspond to the VR 403 in FIG. 4.

The action processing flow 500 starts with step S505 when it is determined whether the user's inputted response has a matching valid action. This step is referred to as a response handling flow. An example of such a response handling flow will be explained below with reference to FIG. 8.

If the user's inputted response has no valid matching action, the main app loop may resume, as represented in step S506.

If there is a matching action, the system determines which one of the pre-determined actions is the matching action for the user, what are the requirements and/or criteria for the matching action, and which other components should be activated and/or notified to execute the matching action, and other actions, etc. An example of such a determination is represented in steps S507-S512.

First, at S507, the system determines whether the matching action is a "buy it" action, and if the answer is positive, the plug-in 502 requests the server 504 to process the "buy it" action. The "buy it" action is an action that is pre-stored in the server, and an individual advertiser may customize the "buy it" action associated with its corresponding advertising content.

For example, an advertiser A may create and store an advertising content A in the server for a specific target audience, and designate that the corresponding "buy it" action for the advertising content A causes the server to send an email to the user, who has made a response associated with the "buy it" action, including the purchase information (e.g., payment method, link to payment webpage, etc.).

In another example, an advertiser B may create and store an advertising content B in the server for a different specific target audience, and designate that the corresponding "buy it" action for the advertising content B causes the server to notify the advertiser B, for example, to initiate an automated order call for the user, etc. As such, the "buy it" action may be customized for each advertiser, or for each different target audience group, or depending on the user's characteristics such as the user's current location, registered address, age, etc.

In the exemplary processing flow 500, in response to the "buy-it" action determined in step S507, the server 504 sends an email to the user with purchase information as shown in step S524. After the email has been sent, the server 504 records the action, as shown in step S525.

If the matching action is not a "buy it" action, then the system determines whether it is a "call now" action, as shown in step S508. If it is a "call now" action, then the advertiser's phone number is automatically dialed on the user's device, as shown in step S514. The advertiser's phone number may be pre-included in the advertising content such that the plug-in does not need to contact the server again to get the information on the advertiser's number.

Additionally or alternatively, one or more relevant phone numbers may be looked up in real time based on the user's location or other specifics. The look-up process of phone numbers may be done locally on the user's device or remotely on the server in which case the relevant information may be transmitted between the user's device and the server through the network.

If the matching action is not a "call now" action, then the system determines whether it is a "go to" action, as shown in step S509. If it is a "go to" action, then the advertiser-designated webpage is automatically opened on the user's device, as shown in step S515. The advertiser-designated webpage may be pre-included in the advertising content such that the plug-in does not need to contact the server again to get the information on the advertiser-designated webpage.

If the matching action is not a "go to" action, then the system determines whether it is a "my vote" action, as shown in step S510. If it is a "my vote" action, then the my vote processing flow is triggered to run, as shown in step S516. An example of such processing flow will be explained below with reference to FIG. 7.

If the matching action is not a "my vote" action, then the system determines whether it is a "send email" action, as shown in step S511. If it is a "send email" action, then the plug-in 502 transmits a request to the server 504 to process the action, as shown in step S517. The server 504, after receiving the request, sends an email to the user. The format and content of the email may be pre-designated by the advertiser. After the email has been sent, the server records the action, as shown in step S527.

If the matching action is not a "send email" action, then the system determines whether it is a "talk back" action, as shown in step S512. If it is a "talk back" action, then the plug-in should reset the associated components to get ready to listen to the user's further feedback. Although not explicitly shown in FIG. 5, there may be additional commands and/or action phrases that may be added to the system such as, non-exclusively, "take picture," "need help," "remind me later," etc.

In the example shown in FIG. 5, after the determination has been made that the matching action is a "talk back" action at S512, the system provides an audio cue to the user (e.g., on the user's device) to signal the user to input his or her feedback, as shown in step S518. Simultaneously, the speech recognizer (VR) 503 is also reset or activated to recognize the user's audio inputs, as shown in step S533 and step S519.

At S520, the plug-in 502 waits for a predetermined number of seconds, e.g., P3 seconds, for the user to make a response. This predetermined parameter P3 may have a default value but may also be modified by the user, user's device, plug-in, publisher application, server, and/or the creator of the advertising content such as the advertiser. For example, P3 may be any value such as 10, 10.5, 11, 12, 13, 14, 15, 16, 17, 18, 19, or any other non-negative value.

P3 may be defined longer than other parameters P1 and P2 because the "talk back" processing associated with P3 is used to receive the user's feedback, which will be lengthier than simple commands, in general.

At S531, the user may input feedback or a further response to the advertising content during the response time, P3. If the user makes a response before the response time runs out, the speech recognizer (VR) 503 recognizes the user-inputted response and notifies the plug-in 502 of the response.

Here, the VR 503 may also return the corresponding text-version to the user. At S521, the plug-in then transmits this decrypted response, having been inputted by the user and decrypted by the VR 503 in case the input was in audio data, to the server 504.

The server 504 then captures the user's response that may comprise the audio and text data as shown in step S528, records this action as shown in step S529, and then notifies the corresponding advertiser of the captured and stored user's feedback.

Any notification method may be used, including, but not limited to, telephone, fax, email, instant message, etc. A preferred notification method may be pre-designated by the individual advertiser, or may be customized based on the user's characteristics, advertiser's characteristics, etc., depending on the technical and design needs of the system.

For example, the notification may be used to allow the advertiser to take further action based on the user's response and/or action. The further action by the advertiser may include a wide range of actions including, but not limited to, a simple return call to the user, sending an email with a link to the shopping cart with the requested item included, and running a separate program or algorithm (e.g.. streaming a customized content to the user, providing more options to the user to interact with the advertiser, etc.) using, for example, an advertising application that may be dynamically downloaded to the user's device through connectivity to the network and the server. An example of such an advertising application is shown in element 111a in FIG. 1, which could be written in languages such as HTML and JavaScript and dynamically downloaded and launched as advertiser app 111b by a browser/interpreter within the server plug-in 102 to leverage sophisticated device/Xapp-enabled capabilities such as audio capture, speech recognition and audio playing.

At S522, the recognized user's message that may comprise either or both the text and audio data may be returned to the user, for example, for confirmation. If confirmed, the VR 503 may be deactivated to stop listening to the microphone of the user's device. Then, at S523, the main app loop may resume. As noted earlier, the return of the user-inputted message may be performed before or at the same time with step S521.

Further, the particular sequence of the process of determining the matching action in steps S507-S512 is neither necessary nor required for the practice of the present invention. In fact, the sequence may be modified in any way as will be desired for a particular set of technical and design needs.

Figure 6:
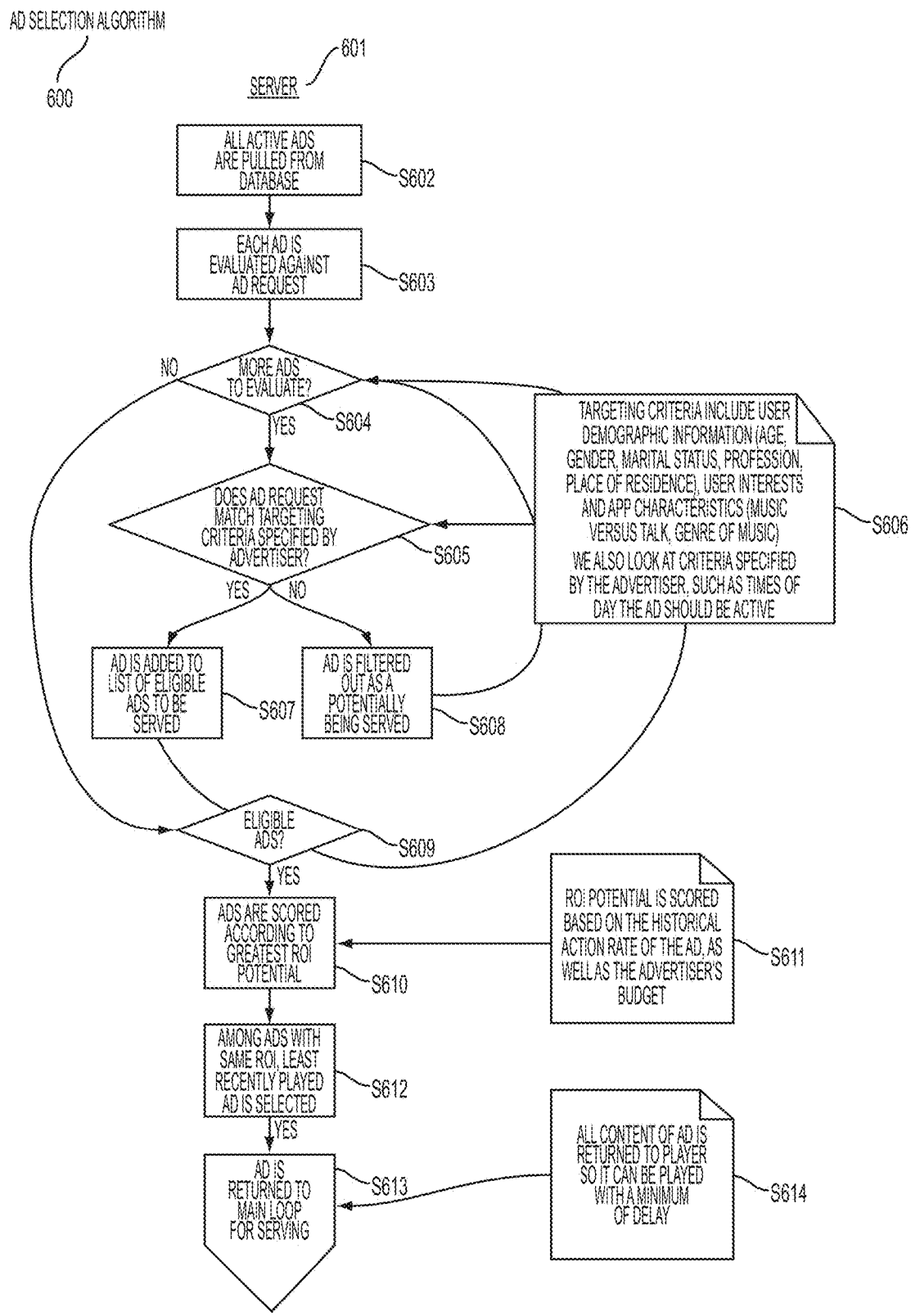
FIG. 6 schematically shows an example of an ad selection algorithm that may apply to step S208 in FIG. 2, in accordance with some embodiments described herein.

FIG. 6 schematically shows an example of an ad selection algorithm that may apply to step S208 in FIG. 2, in accordance with some embodiments described herein. The ad selection algorithm 600 in FIG. 6 may be a computer program stored on a server 601, which causes the server 601 to perform the steps S602-S614, when executed.

The server 601 may correspond to the server 101 in the interactive advertising system 100 in FIG. 1, and/or to the server 203 in FIG. 2. Further, the server 601 may be the same server that is referred in other processing flows in FIGS. 3-5, or a different server.

The advertisements may be created and approved by the advertisers to be pre-stored in database of server 601. Then, the ad selection algorithm 600 that selects target advertising content for a particular user request starts with step S602 by pulling all active ads from the database.

At S603, each active ad is evaluated against the ad request transmitted to the server 601 via the network as well as the advertiser's pre-defined target criteria pre-stored in the server 601. This evaluation process is repeated until there are no more ads to evaluate, as shown in stet S604.

Specifically, the evaluation may be considered as a two-way evaluation. On one hand, the active advertising contents are evaluated against certain criteria embedded in, or associated with, the ad request.

For example, the ad request is first prompted by the publisher application on the user's device, and then transmitted by the plug-in on the user's device to the external server via the network. Here, before the request is transmitted to the server, the publisher application and/or the plug-in may include certain criteria for the advertisements (e.g., certain type of items, price range, etc.) in the request.

When the server receives the ad request, it also receives the ad criteria. The ad criteria may be pre-defined and/or modified by the user operating the device. Based on these criteria, the server pulls a group of active advertising contents that meet the criteria.

Subsequently, the server evaluates the ad request against the target-audience criteria of each of the pulled advertising contents, as represented in steps S605 and S606. The target-audience criteria may include user demographic information such as age, gender, marital status, profession, place of residence, or any other similar factor), application characteristics (e.g., music versus talk, genre of music, or any other similar factor), device characteristics (e.g., current location, network it belongs to, or any other similar factor), and/or other miscellaneous characteristics, including, but not limited to, time of the day, weather, etc. Such target-audience criteria may be pre-designated by the advertiser and stored in the server 601.

At S608, if there are no eligible ads that meet the requirements of the two-way evaluation, the server 601 repeats the second evaluation (i.e., the evaluation of the ad request against the target-audience criteria) with lower standards. The preference and/or weight of each factor in the target-audience criteria is also pre-designated by the advertiser and stored in the server 601. This process repeats until there is an eligible ad that meets the two-way evaluation.

At S607, if there are one or more eligible ads that meet the requirements of the two-way evaluation, those ads are ready to be served (e.g., to be transmitted to the user's device for play). More specifically, if there is only one eligible ad, the ad is immediately transferred to the user's device (e.g., to be received by the plug-in) for play.

If there are two or more eligible ads, the ad selection algorithm 600 may proceed to step S610, where each eligible ad is further evaluated based on a different set of criteria to be provided with a "ROI-score," as shown in step S610 in FIG. 6. The "ROI" may represent the 'Return on Investment' on a particular ad being evaluated. For example, the ROI criteria may include, non-exclusively, the historical action rate of the ad, advertiser's pre-designated budget, etc., as shown in step S611. The ad with a higher ROI-score can then be selected and transmitted to the user's device for service.

If two or more ads have the same ROI-score, the ad that was least recently played can be selected and transmitted to the user's device for service, as shown in step S612.

At S613, the selected ad is returned to the user's device (e.g., received by the plug-in) via the network such that the publisher application and/or the plug-in on the user's device may service the selected ad when the ad-break time occurs. Further, after an ad is selected, the entire content of the selected ad may be transmitted at once to the user's device in order to reduce the delay time on the user's end when servicing the ad content.

Figure 7:
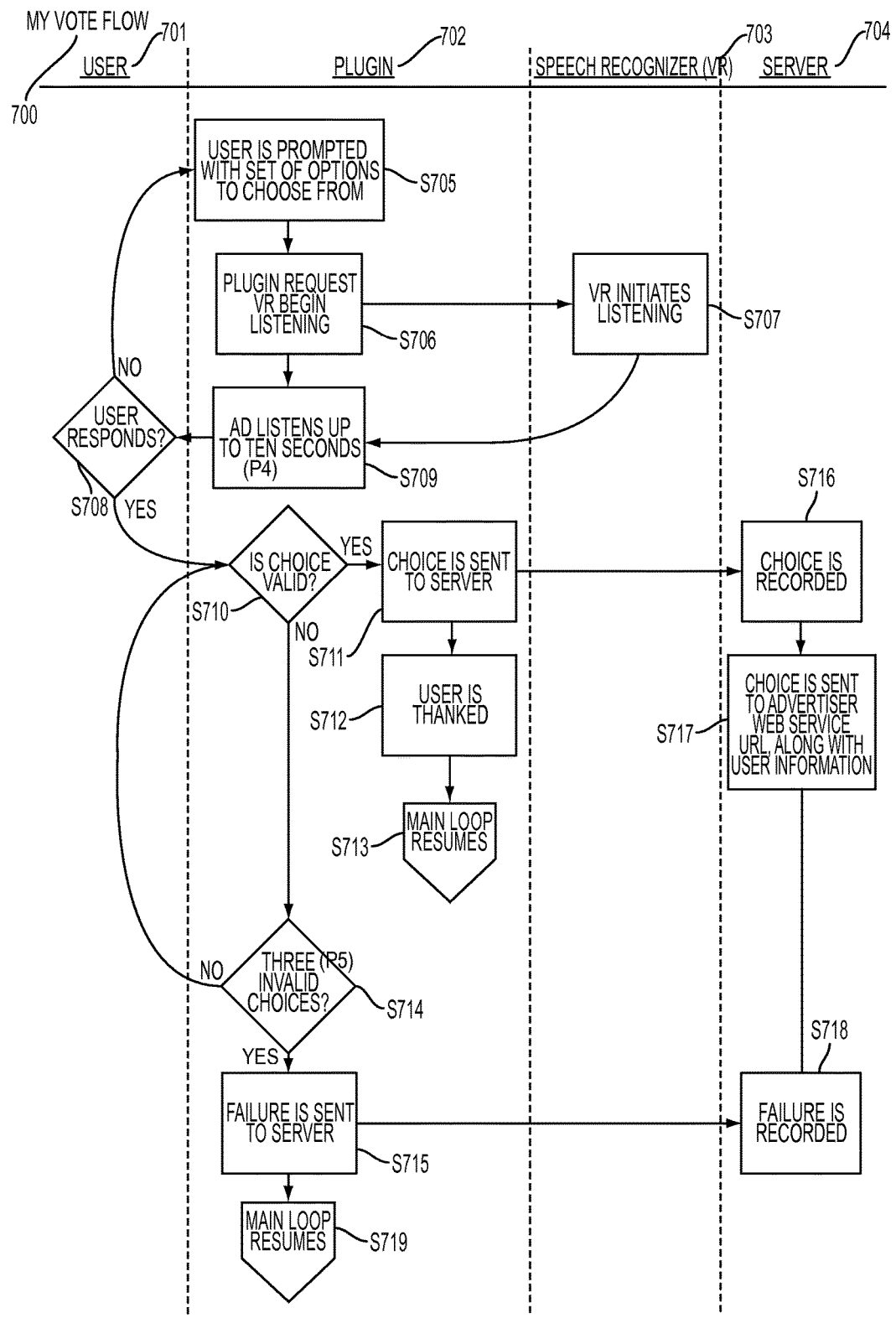
FIG. 7 schematically shows an example of a "my vote" processing flow chart that may apply to step S516 in FIG. 5 in response to a "my vote action," in accordance with some embodiments described herein.

FIG. 7 schematically shows an example of a "my vote" processing flow chart that may apply to step S516 in FIG. 5 in response to a "my vote action," in accordance with some embodiments described herein. The "my vote" processing flow 700 is an example of a processing flow to perform an action that is triggered by a particular user's response associated with this "my vote" command and/or action.

This processing flow may be used to prompt the user to make a choice among the list of pre-defined items, where an item may be a particular action to be performed by the plug-in, the server, or the advertiser, or an advertised item, or any selectable choice as may be defined or customized for each advertiser, and/or user.

In the example shown in FIG. 7, user 701 may correspond to the user 104 in the interactive advertising system 100 in FIG. 1, plug-in 702 in FIG. 7 may correspond to plug-in 102 in FIG. 1, voice-recognizer (VR) 703 in FIG. 7 may correspond to speech e recognizer (VR) 103 in FIG. 1, and server 704 in FIG. 7 may correspond to server 101 in FIG. 1.

Further, the "my vote" processing flow 700 shown in FIG. 7 may apply to step S516 in FIG. 5, in which case the user 701 in FIG. 7 may correspond to the user 501 in FIG. 5, the plug-in 702 in FIG. 7 may correspond to the plug-in 502 in FIG. 5, the VR 703 in FIG. 7 may correspond to the VR 503 in FIG. 5, and the server 704 in FIG. 7 may correspond to the server 504 in FIG. 5.

The "my vote" processing flow 700 starts with step S705, where the user is prompted with set of options to choose from. The prompt may be implemented using either or both an audio file and a visual/graphic notification.

At S706, upon the prompt, the plug-in 702 resets the speech recognizes (VR) 703, in response to which the VR 703 is activated as shown in step S707.

The VR 703 waits a predetermined number of seconds, P4 seconds, to receive the user's response (e.g., choice), as shown in step S709.

The predetermined parameter P4 may have a default value but may also be modified by the user, user's device, plug-in, publisher application, server, and/or the creator of the advertising content such as the advertiser. For example, P4 may be any value such as 7, 8, 9, 10, 10.5, 11, 12, 13, 14, 15, 16, 17, 18, 19, or any other non-negative value.

At S708, if the user does not make a response within the predetermined time period, the flow goes back to step S705 and prompts the user again. This second prompt may be the same as the first prompt, or may be modified, for example, to provide a stronger prompt to the user.

At S708, if the user makes a response during the predetermined time period, the speech recognizer (VR) 703 recognizes and processes (e.g., decrypts) the user's response, and then the system (e.g., plug-in) determines whether the user's response is a valid choice, as represented in step S710.

At S711, if the user's response is a valid choice, then the user's choice is transmitted to the server 704 via the network. At S716, upon receiving the user's choice, the server 704 records it first, and then sends it to the corresponding advertiser (e.g., advertiser-designated web service URL, or any destination that the corresponding advertiser has previously designated) along with the user's information, as shown in step S717.

Simultaneously, on the plug-in's end, the user may be notified of an appreciation message for participating, and then, subsequently, the main loop app may resume, as shown in steps S712 and S713 in FIG. 7.

At S710, if the recognized user's response does not include a valid choice, the system may return a failure message to the user and prompt the user again for a response, as shown in step S705.

If there has been more than a predetermined number of failures (e.g., P5 number of failures) in making a valid choice, which determination is made in step S714 in the exemplary "my vote" processing flow 700 shown in FIG. 7, the system may stop repeating the loop and proceed to transmit a failure message to the server, as shown in step S715.

The predetermined parameter P5 may have a default value such as three (3), but may also be modified by the user, user's device, plug-in, publisher application, server, and/or the creator of the advertising content such as the advertiser. For example, P5 may be any value such as 0, 1, 2, 3, 4, 5, or any other non-negative, integer value.

At S718, upon receiving the failure message, the server 704 first records the failure message and then sends it to the corresponding advertiser (e.g., advertiser-designated web service URL, or any destination that the corresponding advertiser has previously designated) along with the user's information, as shown in step S717.

Simultaneously, on the plug-in's end, the "my vote" processing flow 700 closes and the main app loop may resume, as shown in step S719.

Figure 8:
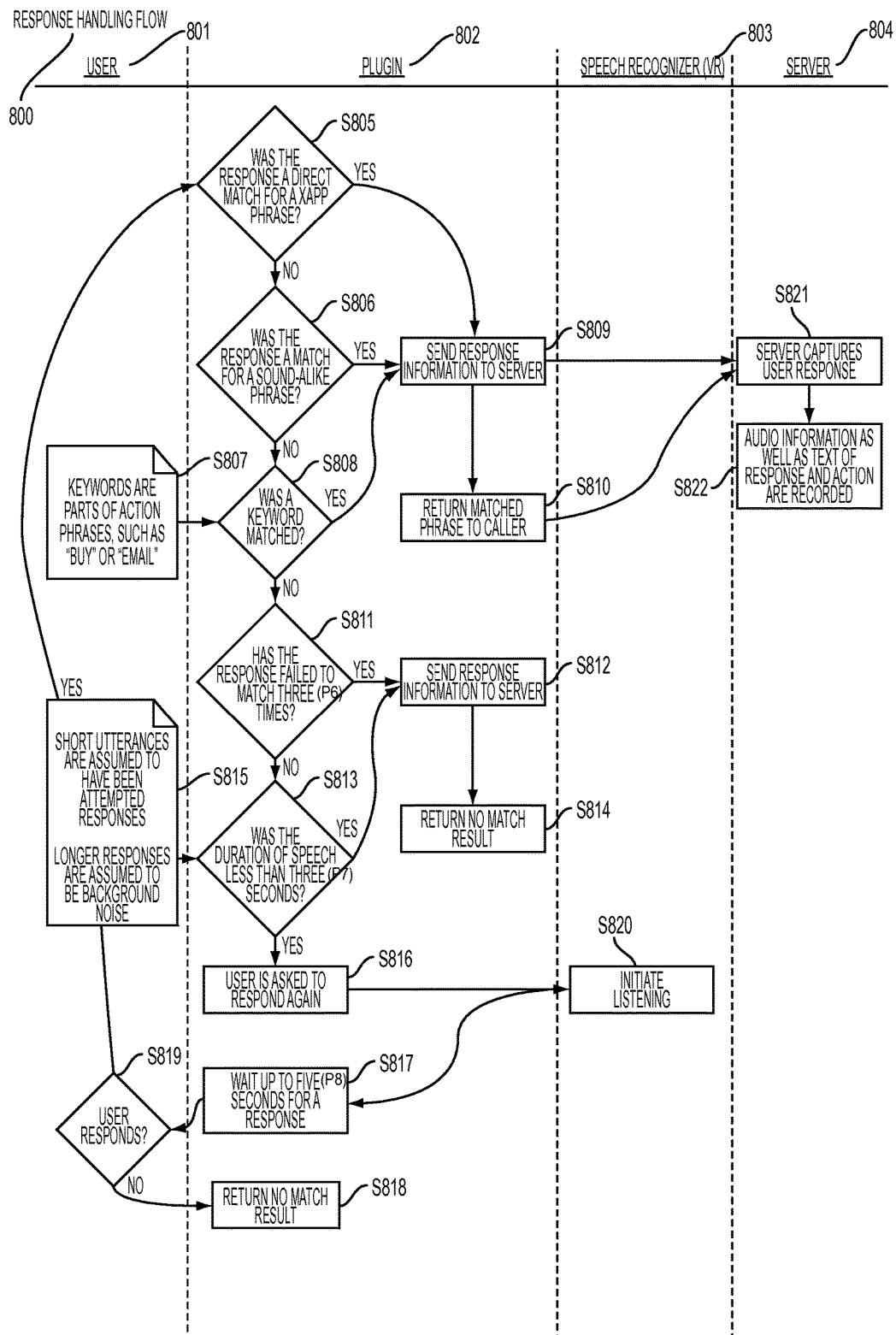
FIG. 8 schematically shows an example of a response handling flow chart that may be apply to step S405 in FIG. 4 and/or step S505 in FIG. 5, in accordance with some embodiments described herein.

FIG. 8 schematically shows an example of a response handling flow chart that may apply to step S405 in FIG. 4 and/or step S505 in FIG. 5, in accordance with some embodiments described herein. As previously-noted with reference to FIGS. 4 and 5, the response handling processing flow 800 may be used to determine whether the user's inputted response (recognized by the speech recognizer) has a valid matching action associated with the user's inputted response.

In the example shown in FIG. 8, user 801 may correspond to the user 104 in the interactive advertising system 100 in FIG. 1, plug-in 802 in FIG. 8 may correspond to plug-in 102 in FIG. 1, speech recognizer (VR) 803 in FIG. 8 may correspond to the VR 103 in FIG. 1, and server 804 in FIG. 8 may correspond to the server 101 in FIG. 1.

Further, the response handling processing flow 800 shown in FIG. 8 may apply to step S405 in FIG. 4 and/or step S505 in FIG. 5, in which case the user 801 in FIG. 8 may correspond to the user 401 in FIG. 4 and/or user 501 in FIG. 5, the plug-in 802 in FIG. 8 may correspond to the plug-in 402 in FIG. 4 and/or plug-in 502 in FIG. 5, the VR 803 in FIG. 8 may correspond to the VR 403 in FIG. 4 and/or the VR 503 in FIG. 5, and the server 804 in FIG. 8 may correspond to the server 504 in FIG. 5.

The response handling processing flow 800 starts with step S805 where the system makes a determination whether the recognized user's response is corresponding to, or associated with, any of the pre-defined command phrases. The list of pre-defined command phrases may be stored in the plug-in, for example, during the installation of the plug-in in the user's device. Further, the plug-in 802 (including, but not limited to, the list of the pre-defined phrases) may be updated (either periodically or per request) from the server 804, as any update or modification to the interactive advertising system is made.

At S809, if the recognized user's response is corresponding to, or associated with, any of the pre-defined command phrases, then the information about the recognized user's response as transmitted to the server 804 through the network. At S821, upon receiving this response information, the server 804 captures and stores the response in either or both the audio format and the corresponding text format, as represented in step S822.

Simultaneously, on the plug-in's end, the matched action phrase is returned to the user, for example, for notification and/or confirmation, as shown in step S810.

At S806, if the recognized user's response is not corresponding to, or associated with, with any of the pre-defined command phrases, then the system further determines whether the recognized user's response is corresponding to, or associated with, a sound-alike command phrase. The sound-alike phrases are the phrases that sound similar to the pre-defined command phrases. If there is a match for such a sound-alike phrase of any particular predefined command phrase, this causes the system to determine that the user's response is calling for that pre-defined command phrase and returns to step 809.

In other words, the system transmits the user's response in its native form along with information indicating that the user's response is calling for the pre-defined command phrase that was determined at S806.

At S808, if the recognized user's response is not a match for a sound-alike phrase of any of the pre-defined phrases, then the system further determines whether the recognized user's response includes any one of the pre-defined keywords. One or more keywords that are parts of the pre-defined action phrases may be pre-stored for triggering the corresponding action phrases. The keywords may be pre-stored for each of the pre-defined action phrases. For example, for the action phase "buy it," the keyword may be "buy," and similarly, for the action phrase "send email," the keyword may be "email," as described in block S807. There may be more than one keyword for one action phrase.

TABLE 1 below shows an example of a correspondence table among the action phrases, corresponding actions triggered by each of the action phrases, and sound-alike or keywords that do not exactly match the action phrases but can still trigger the corresponding actions.

TABLE 1

An exemplary correspondence table

| Action Phrase | Action Triggered | Other words users may use to make the same response |
|---|---|---|
| Say "TELL ME MORE" to hear the details | Triggers information audio (generic) | More info, more, info, any custom phrase (e.g., brand name), etc. |
| Just say "XXXX ME" (custom phrase) to learn more | Triggers information audio (branded) | More info, more, info, "XXXX", any custom phrase (e.g., brand name), etc. |
| Say "CALL NOW" to speak to an agent | Triggers call activation to advertiser | Agent, call, salesperson, etc. |
| Say "SEND EMAIL" to get the get more information | Triggers email response from advertiser and/or server | Send it to me, text me, etc. |
| Say "BUY IT" to purchase now | Triggers purchase process | Buy now, purchase, get it, I'll take it, etc. |
| Say "GO TO" the webpage to see the offer | Triggers mobile browser launch | Web page, website, etc. |
| Say "MY VOTE" to participate | Triggers list of choices for a poll, vote, or smack down | Ask me, my choice, etc. |
| Say "TALK BACK" to let us know what you think | Triggers 15 second free form response | Feedback, etc. |
| Say "INSTALL APP" to download now | Triggers mobile app to be downloaded and cued for installation on user's device | Download App, etc. |

As shown in Table 1, action phrases may include a fabricated word or phrase, as represented in Table 1 by "XXXX". The fabricated word or phrase may be a custom word that is customized for a particular product, user, system, publisher, advertising content, or any similar factor.

The fabricated word or phrase may also include a word or phrase that is made up or invented by system designers, publishers, or any other entities. The fabricated word or phrase may further be a brand name, a product name, a trademark, an oronym, a homophone, etc. For example, a fabricated phrase, "xappme" (pronounced "zap me"), may be associated with a particular action (e.g., triggering more information, or any action that is frequently used by users, etc.) for convenience of the users.

The fabricated word or phrase may be intentionally chosen to be the one that is not used often in everyday speech such that the fabricated word or phrase is exclusively associated with a command for the interactive advertising system. The exclusive association is possible because the fabricated word or phase is selected to the one that is not used often in people's everyday speech, and therefore, is not likely used as a command phrase for other applications unrelated to the interactive advertising system.

Such a feature may help prevent the voice-recognizing system in the device from being confused between a command in the interactive advertising system and a command in other applications unrelated to the interactive advertising system. This feature allowing an easy recognition of a command for the interactive advertising may help better distinguish valid commands for the interactive advertising system from mere noises or other unrelated commands, and consequently, reduce false-positive commands and associated operational errors in the system.

If there is a matching keyword in the recognized user's response, the corresponding action phrase is transmitted to the server, as shown in step S809, and the matched action phrase is returned to the user, for example, for notification and/or confirmation, as shown in step S810.

If there is no matching keyword, the system then determines whether the failure to find a matching action phrase for the user's response has repeated more than a predetermined number of times, e.g., P6 times.

The predetermined parameter P6 may have a default value such as three (3), but may also be modified by the user, user's device, plug-in, publisher application, server, and/or the creator of the advertising content such as the advertiser. For example, P6 may be any value such as 0, 1, 2, 3, 4, 5, or any other non-negative, integer value.

At S811, if the failure has repeated more than P6 times, the plug-in transmits the user's response to the server along with the information indicating the failure to find a matching action phrase for the user's response, as shown in step S812. Upon receiving the user's response and the failure information from the plug-in through the network, the server 804 still captures and stores the user's response in either or both the audio format and the corresponding text format, as shown in steps S821 and S822.

Simultaneously, on the plug-in's end, the failure message is returned to the user as notification as shown in step S814.

If the failure has not repeated more than P6 times as determined in step S811, the system determines whether the duration of the user's audio file (e.g., representing the user's speech or response) was less than a predetermined length (e.g., P7 seconds), as shown in step S813.

The predetermined parameter P7 may have a default value such as three (3), but may also be modified by the user, user's device, plug-in, publisher application, server, and/or the creator of the advertising content such as the advertiser. For example, P7 may be any value such as 1.5, 2, 2.5, 3, 3.5, 4, 4.5, or any other non-negative value.

As represented in block S815, short utterances by the user may be associated with potential, attempted responses by the user, whereas long utterances by the user may be associated with mere background noises.

Accordingly, at S813, if the duration of the user's audio file was less than P7 seconds, then the user is asked to respond again for clarification, as represented in step S816. Then, the speech recognizer 803 is activated, as shown in step S820. An example of how the speech recognizer 803 may receive and recognize the user's audio command is explained above with reference to the "receive response" steps, as represented in, for example, step S308 (including steps S309-S314) in FIG. 3, and/or step S420 (including steps S409-S414) in FIG. 4.

In the exemplary response handling flow 800 shown in FIG. 8, the plug-in 802 may wait up to a predetermined number of seconds (e.g., P8 seconds) after the speech recognizer 803 has been initiated, as shown in step S817.

The predetermined parameter P8 may have a default value such as five (5), but may also be modified by the user, user's device, plug-in, publisher application, server, and/or the creator of the advertising content such as the advertiser. For example, P8 may be any value such as 1.5, 2, 2.5, 3, 3.5, 4, 4.5, or any other non-negative value.

If the user makes a new response within P8 seconds, then the system repeats the loop from the step S805 to search for a matching action phrase for the newly inputted user's response. If the user does not make a new response within P8 seconds, then the plug-in 802 returns a match-failure message to the user 801, as represented in step S818. This step may be the same as the steps S812 and S814, or simpler such that S818 does not cause the plug-in 802 to transmit the failure message to the server 804.

In accordance with the above disclosure, the system (e.g., plug-in and speech recognizer) may be able to recognize and process a user's audio command, even if the command does not exactly match the pre-defined phrases.

FIG. 9 shows an example of a screenshot of an ad manager application, in accordance with some embodiments described herein. An ad manager application may be used by individual advertisers to customize their corresponding advertising contents or any information associated with the content For example, this application may allow individual advertisers to connect to the server through the network and to store/change/remove any information associated with their corresponding advertising content, or even to make a link between the server in the network and their own local server such that, for example, the server in the network may trigger a certain action on the local server, or vice versa.

In the example shown in FIG. 9, element 910 shows an exemplary screenshot of an ad manager where an ad audio file, an ad image, a scrolling text, and a target URL may be customized for individual advertisers.

On the other hand, element 920 snows an exemplary screenshot of an ad manager where the definition of actions corresponding to various different command action phrases (e.g., tell me more, buy it, call now, send email, go to, my vote, talk back) may be customized for individual advertisers.

The actions may include a wide range of custom functionalities, such as, non-exclusively, playing a custom audio file, running a custom algorithm or program, connecting to the local server of the advertiser, calling a pre-defined number, calling a number that is searched in real time, opening a pre-defined webpage on the user's device, opening a webpage that is searched in real time, etc.

Further, the application may also allow users to define an alias for one or more specific actions. In the example shown in the screenshot 920, the application allows users to define an alias for the "tell me more" action. The alias may be a fabricated phrase, including, but not limited to, a brand name, a product name, a trademark, an oronym, a homophone, etc.

Figure 10:
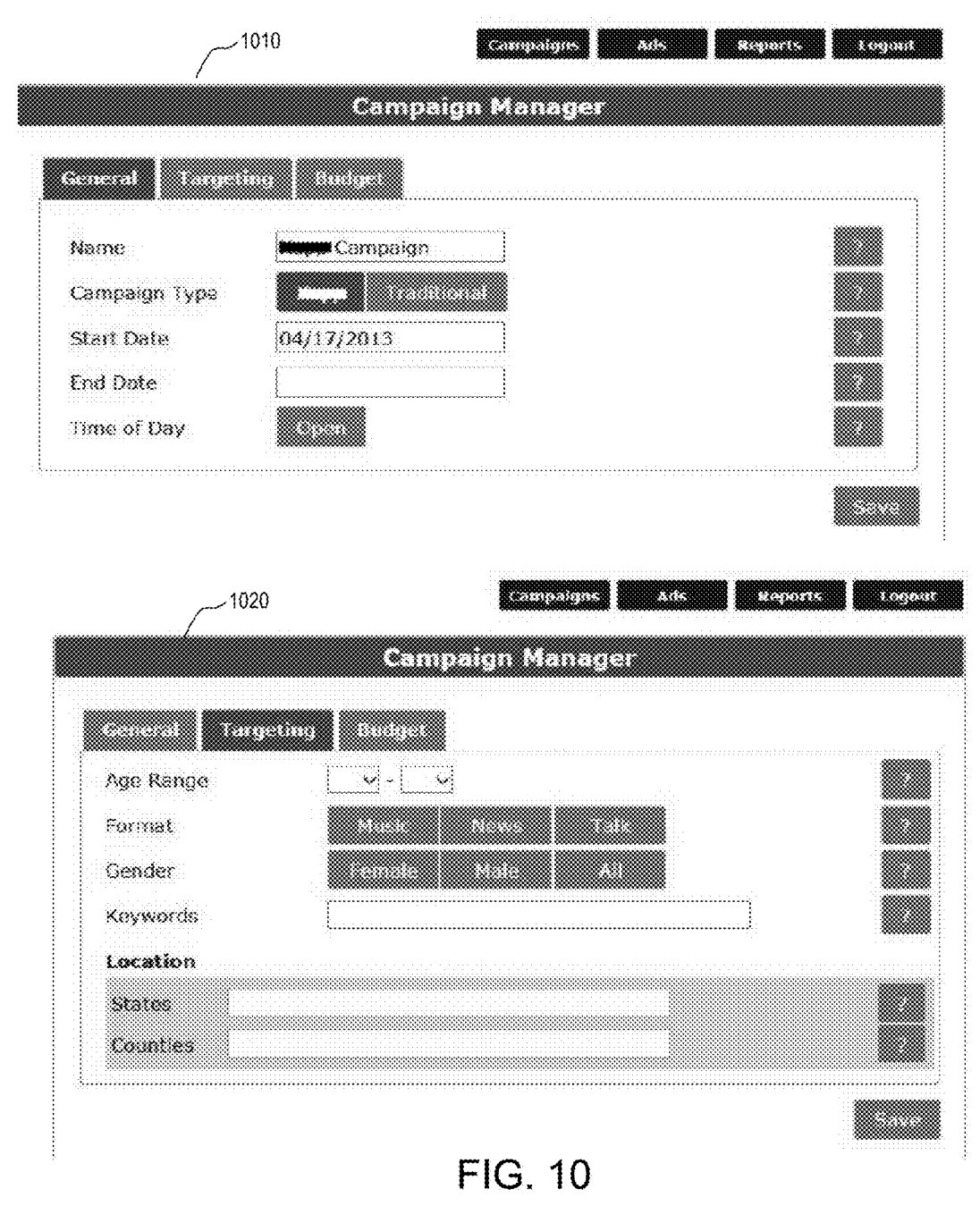

FIG. 10 shows an example of a screenshot of a campaign manager application, in accordance with some embodiments described herein. The interactive advertising system explained above delivers advertisements to users for advertisers based on fulfilling terms defined in a campaign, including, but not limited to, budget, ad(s), start date, end date, time-of-day, target age range, target gender, keywords, location, cost per thousand impressions, cost per "tell me more", and cost per action. FIG. 10 shows an example of an interactive advertising system for a campaign.

In the example shown in FIG. 10, element 1010 shows an exemplary screenshot of a campaign manager on the 'general' tab where the name of campaign, campaign type, start and end dates, and/or time of day, may be customized for each campaign.

On the other hand, element 1020 shows an exemplary screenshot of a campaign manager on the 'targeting' tab, where the targeted audience may be customized based on various factors, including, but not limited to, the characteristics of users/listeners (e.g., age, gender, location, etc.), publisher applications running on users' devices (e.g., music, news, talk, etc.), native features of the users' devices (e.g., radio, tv, Bluetooth, headset, etc.), etc.

The screenshots shown in FIGS. 9 and 10 are provided only as examples, and many other characteristics, features, and/or functionalities may be added to the system in accordance with the claims and embodiments described herein through obvious modifications to the high and/or low-level designs of the system.

From the foregoing it will be appreciated that, although specific embodiments of the interactive advertising system according to the claims have been described herein for purposes of illustration, various modifications may be made without deviating from the spirit and core principle of the claimed subject matter.

What is claimed:

1. A user device comprising:
a speech recognizer;
one or more processors;
a memory storing one or more programs comprising instructions, which when executed by the one or more processors, cause the device to:
play radio content that is streamed to a plurality of user devices from a first remote server, the radio content comprising one or more break times;
play interactive content during the one or more break times of the radio content, wherein the interactive content comprises a first interactive content and a second interactive content, the first interactive content being streamed to the plurality of user devices from a second remote server, and the second interactive content being streamed to the plurality of user devices from a third remote server;
receive first command-action correspondence data for the first interactive content from the second remote server, the first command-action correspondence data associating a set of first voice commands with a set of first actions;
receive second command-action correspondence data for the second interactive content from the third remote server, the second command-action correspondence data associating a set of second voice commands with a set of second actions different from the set of first actions;
in response to playing the first interactive content:
activate the speech recognizer and receive a user's first voice command using the activated speech recognizer; and
perform a first action responding to the user's first voice command according to the first command-action correspondence data; and
in response to playing the second interactive content:
activate the speech recognizer and receive a user's second voice command using the activated speech recognizer; and
perform a second action responding to the user's second voice command according to the second command-action correspondence data.

2. The device of claim 1, wherein the first command-action correspondence data is modifiable by the second remote server.

3. The device of claim 1, wherein the first action performed in response to receiving the user's first voice command comprises initiating a phone call using voice-over-IP (VOIP).

4. The device of claim 1, wherein the first action performed in response to receiving the user's first voice command comprises opening a webpage on a display of the user device.

5. The device of claim 1, wherein the first action performed in response to receiving the user's first voice command comprises sending an email to a remote device.

6. The device of claim 1, wherein the first action performed in response to receiving the user's first voice command comprises downloading an application from a remote device and installing the downloaded application on the user device.

7. The device of claim 1, comprising a mechanical input mechanism, and wherein the one or more programs further comprise instructions, which when executed by the one or more processors, cause the device to:
while the speech recognizer is activated, receive a user's mechanical input using the mechanical input mechanism; and
in response to receiving the user's mechanical input, perform an action responding to the user's mechanical input according to the first command-action correspondence data.

8. The device of claim 1, wherein to play the radio content, a connection is established between the first remote server and the user device, and wherein the connection to the first remote server is switched with a connection to the second remote server immediately before a first break time starts in the radio content.

9. The device of claim 8, wherein after the first break time is over, the connection to the second remote server terminates and the connection to the first remote server is restored.

10. A server for providing interactive content to a plurality of user devices, the server comprising a memory storing one or more programs comprising instructions for the one or more processors, which when executed by the one or more processors, cause the server to:
- broadcast radio content to a plurality of user devices, the radio content comprising a first break time and a second break time;
- cause a second remote server to provide a first interactive content to the plurality of user devices during the first break time of the radio content;
- cause a third remote server to provide a second interactive content to the plurality of user devices during the second break time of the radio content;
- cause the second remote server to transmit first command-action correspondence data for the first interactive content to the plurality of user devices, the first command-action correspondence data associating a set of first voice commands with a set of first actions;
- cause the third remote server to transmit second command-action correspondence data for the second interactive content, the second command-action correspondence data associating a set of second voice commands with a set of second actions different from the set of first actions;
- cause the second remote server to receive a first voice command from a first user device from the plurality of user devices, in response to providing the first interactive content;
- cause the first user device to perform a first action according to the first command-action correspondence data associating the first voice command with the first action;
- cause the third remote server to receive a second voice command from the first user device, in response to providing the second interactive content;
- cause the first user device to perform a second action according to the second command- action correspondence data associating the second voice command with the second action.

11. A method for providing interactive content, the method comprising:
at an electronic media playback device:
- playing radio content that is streamed to a plurality of user devices from a first remote server, the radio content comprising one or more break times;
- playing interactive content during the one or more break times of the radio content, wherein the interactive content comprises a first interactive content and a second interactive content, the first interactive content being streamed to the plurality of user devices from a second remote server, and the second interactive content being streamed to the plurality of user devices from a third remote server;
- receiving first command-action correspondence data for the first interactive content from the second remote server, the first command-action correspondence data associating a set of first voice commands with a set of first actions;
- receiving second command-action correspondence data for the second interactive content from the third remote server, the second command-action correspondence data associating a set of second voice commands with a set of second actions different from the set of first actions;
- in response to playing the first interactive content:
  - activating a speech recognizer of the device and receiving a user's first voice command using the activated speech recognizer; and
  - performing a first action responding to the user's first voice command according to the first command-action correspondence data; and
- in response to playing the second interactive content:
  - activating the speech recognizer and receive a user's second voice command using the activated speech recognizer; and
  - performing a second action responding to the user's second voice command according to the second command-action correspondence data.

12. The method of claim 11, wherein the first command-action correspondence data is modifiable by the second remote server.

13. The method of claim 11, wherein the first action performed in response to receiving the user's first voice command comprises initiating a phone call using voice-over-IP (VOIP).

14. The method of claim 11, wherein the first action performed in response to receiving the user's first voice command comprises opening a webpage on a display of the media playback device.

15. The method of claim 11, wherein the first action performed in response to receiving the user's first voice command comprises sending a text message to a remote device associated with the first interactive content.

16. The method of claim 11, wherein the first action performed in response to receiving the user's voice first command comprises downloading an application from a remote device associated with the first interactive content and installing the downloaded application on the media playback device.

17. The method of claim 11, further comprising:
- while the speech recognizer is activated, receiving a user's mechanical input using a mechanical input mechanism of the media playback device; and
- in response to receiving the user's mechanical input, performing an action responding to the user's mechanical input according to the first command-action correspondence data.

18. The method of claim 11, wherein to play the radio content, a connection is established between the first remote server and the media playback device, and wherein the connection to the first remote server is switched with a connection to the second remote server immediately before a first break time starts in the radio content.

19. The method of claim 18, wherein after the first break time is over, the connection to the second remote server terminates and the connection to the first remote server is restored.

20. A non-transitory computer readable medium storing computer instructions, which when executed by an electronic media playback device, cause the device to:
- play radio content that is streamed to a plurality of user devices from a first remote server, the radio content comprising one or more break times;
- play interactive content during the one or more break times of the radio content, wherein the interactive content comprises a first interactive content and a second interactive content, the first interactive content being streamed to the plurality of user devices from a second remote server, and the second interactive content being streamed to the plurality of user devices from a third remote server;
- receive first command-action correspondence data for the first interactive content from the second remote server, the first command-action correspondence data associating a set of first voice commands with a set of first actions;

receive second command-action correspondence data for the second interactive content from the third remote server, the second command-action correspondence data associating a set of second voice commands with a set of second actions different from the set of first actions;

in response to playing the first interactive content:
activate the speech recognizer and receive a user's first voice command using the activated speech recognizer; and
perform a first action responding to the user's first voice command according to the first command-action correspondence data; and in response to playing the second interactive content:
activate the speech recognizer and receive a user's second voice command using the activated speech recognizer; and
perform a second action responding to the user's second voice command according to the second command-action correspondence data.

21. The medium of claim 20, wherein to play the radio content, a connection is established between the first remote server and the media playback device, and wherein the connection to the first remote server is switched with a connection to the second remote server immediately before a first break time starts in the radio content.

22. The medium of claim 21, wherein after the first break time is over, the connection to the second remote server terminates and the connection to the first remote server is restored.

* * * * *